US011343583B2

(12) United States Patent
Zhang

(10) Patent No.: US 11,343,583 B2
(45) Date of Patent: May 24, 2022

(54) METHOD FOR DISPLAYING GUI FOR PROVIDING MENU ITEMS AND DISPLAY DEVICE

(71) Applicant: HISENSE VISUAL TECHNOLOGY CO., LTD., Shandong (CN)

(72) Inventor: Xin Zhang, Shandong (CN)

(73) Assignee: Hisense Visual Technology Co., Ltd., Shandong (CN)

( * ) Notice: Subject to any disclaimer, the term of this patent is extended or adjusted under 35 U.S.C. 154(b) by 0 days.

(21) Appl. No.: 16/822,756

(22) Filed: Mar. 18, 2020

(65) Prior Publication Data
US 2020/0329281 A1 Oct. 15, 2020

Related U.S. Application Data

(63) Continuation of application No. PCT/CN2020/075606, filed on Feb. 17, 2020.

(30) Foreign Application Priority Data

Apr. 11, 2019 (CN) .......................... 201910290320.8

(51) Int. Cl.
*H04N 5/445* (2011.01)
*H04N 21/485* (2011.01)
(Continued)

(52) U.S. Cl.
CPC ....... *H04N 21/4858* (2013.01); *G06F 3/0482* (2013.01); *G06F 3/04817* (2013.01);
(Continued)

(58) Field of Classification Search
CPC ........... H04N 21/4858; H04N 21/4856; H04N 21/4854; H04N 21/4221; H04N 21/482;
(Continued)

(56) References Cited

U.S. PATENT DOCUMENTS 5,671,378 A * 9/1997 Acker ..................... G06F 9/454
715/801
7,765,568 B1 * 7/2010 Gagnon ............. H04N 21/4312
725/38
(Continued)

FOREIGN PATENT DOCUMENTS

CN  1256457 A   6/2000
CN  101042643 A  9/2007
(Continued)

OTHER PUBLICATIONS

International Search Report and translation for application No. PCT/CN2020/075606 dated May 7, 2020 (7 pages).
(Continued)

*Primary Examiner* — Jefferey F Harold
*Assistant Examiner* — Sahar Aqil Riaz
(74) *Attorney, Agent, or Firm* — Crowell & Moring

(57) ABSTRACT

The present application discloses a GUI method for providing menu items, which is used to automatically adjust display locations of the menu items according to a setting language of a display device. The method includes: displaying an image content in a content display area of a display in response to a first control instruction input by a user and used for displaying the image content; and calculating a layout location of at least one menu item in a menu display area of the display based on a setting language of the display device, where the at least one menu item is configured for the image content and used to perform functions required for the image content; and displaying the at least one menu item based on the calculated layout location.

14 Claims, 28 Drawing Sheets

(51) Int. Cl.
  *G06F 3/04842* (2022.01)
  *G06F 3/0482* (2013.01)
  *G06F 3/04817* (2022.01)
  *H04N 21/422* (2011.01)

(52) U.S. Cl.
  CPC ..... *G06F 3/04842* (2013.01); *H04N 21/4221* (2013.01); *H04N 21/4854* (2013.01); *H04N 21/4856* (2013.01)

(58) Field of Classification Search
  CPC ............ H04N 21/4312; G06F 3/04842; G06F 3/0482; G06F 3/04817; G06F 9/451; G06F 2203/04803
  USPC .......................................................... 725/44
  See application file for complete search history.

(56) References Cited

U.S. PATENT DOCUMENTS

| | | | | |
|---|---|---|---|---|
| 2008/0059877 | A1* | 3/2008 | Brookler | G06F 9/454 715/264 |
| 2010/0229194 | A1* | 9/2010 | Blanchard | G06F 3/038 725/39 |
| 2012/0033039 | A1* | 2/2012 | Sasaki | H04N 13/161 348/43 |
| 2012/0072867 | A1* | 3/2012 | Schlegel | G06F 3/0481 715/808 |
| 2012/0213492 | A1* | 8/2012 | Takeuchi | H04N 13/183 386/244 |
| 2014/0123183 | A1* | 5/2014 | Fujimoto | H04N 21/4221 725/37 |
| 2015/0301785 | A1* | 10/2015 | Nagahiro | G06T 3/40 345/2.2 |
| 2016/0156957 | A1* | 6/2016 | Yun | H04N 21/44204 725/14 |
| 2016/0191980 | A1* | 6/2016 | Yu | H04N 21/4316 725/40 |
| 2016/0291944 | A1 | 10/2016 | Jefferson | |
| 2017/0094367 | A1* | 3/2017 | Crabb | H04N 21/4126 |
| 2019/0327534 | A1* | 10/2019 | Voth | H04N 21/25808 |
| 2020/0387567 | A1* | 12/2020 | Loforte | G06F 16/313 |

FOREIGN PATENT DOCUMENTS

| | | |
|---|---|---|
| CN | 101114225 A | 1/2008 |
| CN | 102196210 A | 9/2011 |
| CN | 102207870 A | 10/2011 |
| CN | 102707940 A | 10/2012 |
| CN | 105159868 A | 12/2015 |
| CN | 106095374 A | 11/2016 |
| CN | 106598562 A | 4/2017 |
| CN | 108616778 A | 10/2018 |
| CN | 110012340 A | 7/2019 |

OTHER PUBLICATIONS

Office Action for Chinese Application No. 2020112302152670 dated Nov. 26, 2020, 8 pages.

English translation of Office Action for Chinese Application No. 2020112302152670.

* cited by examiner

METHOD FOR DISPLAYING GUI FOR PROVIDING MENU ITEMS AND DISPLAY DEVICE

CROSS-REFERENCE TO RELATED APPLICATION

The present application is a continuation application of International Application No. PCT/CN2020/075606 filed on Feb. 17, 2020, which claims the priority to Chinese patent application No. 201910290320.8, filed on Apr. 11, 2019 and entitled "METHOD FOR DISPLAYING GUI FOR PROVIDING MENU ITEMS AND DISPLAY DEVICE", the content of which is incorporated in the present application by reference.

FIELD

The present application relates to the field of display, particularly to a method for displaying a GUI for providing menu items and a display device.

BACKGROUND

In order to meet personalized needs of users, display devices may not only provide users with various traditional program contents received via data broadcasting, but also provide users with various applications and service contents provided by content manufacturers.

While displaying the various contents, display devices also provide menu items for operations on the various contents. However, display locations of these menu items provided by the display devices are usually fixed. After the language of display devices is switched based on a user's instruction, these menu items are usually displayed in disorder, affecting the visual experience of the users.

For example, when expressing a term with the same meaning, texts in English and Portuguese may have different lengths, which may result in an incomplete display of the text in a reserved space, or even text overlay or overlap on a user interface. Thus, to some extent, the layout and/or visual effects of an original user interface may be affected.

SUMMARY

The embodiments of the present application provide a method for displaying a Graphical User Interface (GUI) for menu items and a display device, which are used to automatically adjust display locations of the menu items according to a setting language of the display device, thereby improving the visual experience of users.

According to a first aspect, the embodiments of the present application provide a method for presenting a GUI. The method includes: in response to a first control instruction for displaying first image content input from a user, displaying the first image content in a content display area of a display; according to a setting language of the display device, calculating a first layout location of at least one menu item in the menu display area of the display, where the at least one menu item is configured for the first image content and used to perform functions associated with the first image content; and displaying the at least one menu item based on the first layout location.

In some embodiments, the at least one menu item is configured by default or by settings of the user.

In some embodiments, the at least one menu item is arranged from one edge to an other edge of the menu display area, so as to keep any two menu items spaced overlapping with each other.

In some embodiments, the calculating the first layout location of the at least one menu item in the menu display area includes: calculating a width occupied by the at least one menu item in the menu display area based on the setting language of the display device; and determining the first layout location of the at least one menu item in the menu display area based on the calculated width and an arrangement direction from one edge to the other edge of the menu display area.

In some embodiments, a menu item of the at least one menu item comprises a name of the menu item and an icon of the menu item.

In some embodiments, the calculating the width occupied by the at least one menu item in the menu display area includes: calculating a text width corresponding to the name of the menu item in the setting language of the display device; obtaining a width corresponding to the icon of the menu item; and determining a sum of the text width corresponding to the name and the width corresponding to the icon as the width occupied by the menu item.

In some embodiments, the method further includes: in response to a second control instruction for modifying the setting language of the display device input from the user, updating the setting language of the display device; in response to a third control instruction for displaying second image content input from the user, displaying the second image content in the content display area of the display, wherein the second image content corresponds to the first image content in updated setting language of the display device; calculating a second layout location of the at least one menu item in the menu display area of the display according to the updated setting language of the display device, wherein the at least one menu item is configured for the second image content and used to perform functions associated with the second image content; and updating display of the at least one menu item in the content display area according to the second layout location.

In some embodiments, function information of a menu item of the at least one menu item corresponds to a color key on a control device for providing user input to the display device.

In the second aspect, the embodiments of the present application provide a display device. The display device includes: a display configured to display images; and a controller configured to: in response to a first control instruction for display of first image content input from a user, display the first image content in a content display area of the display; according to a setting language of the display device, calculate a first layout location of at least one menu item in a menu display area of the display, wherein the at least one menu item is configured for the first image content and used to perform functions associated with the first image content; and display the at least one menu item according to the first layout location.

In some embodiments, the at least one menu item is configured by default or by settings of the user.

In some embodiments, the at least one menu item is arranged from one edge to an other edge of the menu display area, so as to keep any two menu items spaced without overlapping with each other.

In some embodiments, the controller is configured to calculate the first layout location of the at least one menu item in the menu display area by: calculating a width occupied by the at least one menu item in the menu display area based on the setting language of the display device; and determining the first layout location of the at least one menu item in the menu display area based on the calculated width and an arrangement direction from one edge to an other edge of the menu display area.

In some embodiments, a menu item of the at least one menu item comprises a name of the menu item and an icon of the menu item.

In some embodiments, the controller is configured to calculate the width occupied by the at least one menu item in the menu display area by: calculating a text width corresponding to the name of the menu item in the setting language of the display device; obtaining a width corresponding to the icon of the menu item; and determining a sum of the text width corresponding to the name and the width corresponding to the icon as the width occupied by the menu item.

In some embodiments, the controller is further configured to: in response to a second control instruction for modification of the setting language of the display device input from the user, update the setting language of the display device; in response to a third control instruction for display of second image content input from the user, display the second image content in the content display area of the display, wherein the second image content corresponds to the first image content in updated setting language of the display device; calculate a second layout location of the at least one menu item in the menu display area of the display according to the updated setting language of the display device, wherein the at least one menu item is configured for the second image content and used to perform functions associated with the second image content; and update display of the at least one menu item in the content display area according to the second layout location.

In some embodiments, function information of a menu item of the at least one menu item corresponds to a color key on a control device for providing user input to the display device.

In the third aspect, the embodiment of the present application provides a television, including: a remote controller including a plurality of color keys; and a display device including a display and a controller, where the display is configured to display images; and the controller is configured to: receive a first control instruction to display first image content through the remote controller; display the first image content in a content display area of the display in response to the first control instruction; calculate a first layout location of at least one menu item in the menu display area of the display based on the setting language of the display device, where the at least one menu item is configured for the first image content and used to perform functions associated with the first image content; and display at least one menu item based on the first layout location.

In some embodiments, one of the at least one menu item is configured to be controlled by one of the plurality of color keys of the remote controller.

In the above-mentioned embodiments, the display device may provide the image content and can calculate the actual layout location of at least one menu item for performing the functions required for the image content according to the currently setting system language, so as to realize the self-adaptation of menu item layout in different system languages and avoid the incomplete display, overlap or coverage of the menu items in different system languages due to the fixed display location, thus to improve the users' visual experience.

DETAILED DESCRIPTION OF THE EMBODIMENTS

In order to make the purpose, technical scheme and advantages of exemplary embodiments of the present application clearer, the technical solution in the exemplary embodiments of the present application will be clearly and completely discussed below in combination with accompanying drawings in the exemplary embodiments of the present application. The exemplary embodiments described are only part of the embodiments of the present application, not all of the embodiments.

Based on the embodiments shown in the present application, all other embodiments obtained by those skilled in the art without creative work shall fall within the scope of protection of the present application. In addition, although the disclosed contents in the present application are presented in accordance with one or more exemplary examples, it shall be understood that a complete technical solution may be formed separately with each aspect of the disclosed contents.

The terms "include" and "have" used in the present application and any variations thereof intend to refer to non-exclusive inclusions. For example, products or devices that include a series of components are not limited to those components clearly described, but may include other components that are not clearly described or inherent to these products or devices.

The term "module" used in the present application refers to any combination of known or later developed hardware, software, firmware, artificial intelligence, fuzzy logic or hardware or/and software code, and the combination is capable of performing the functions related to the components.

The term "gesture" used in the present application refers to a user behavior for expressing an anticipated idea, action, purpose/or result by means of a shape change of a hand or movement of a hand.

Figure 1A:
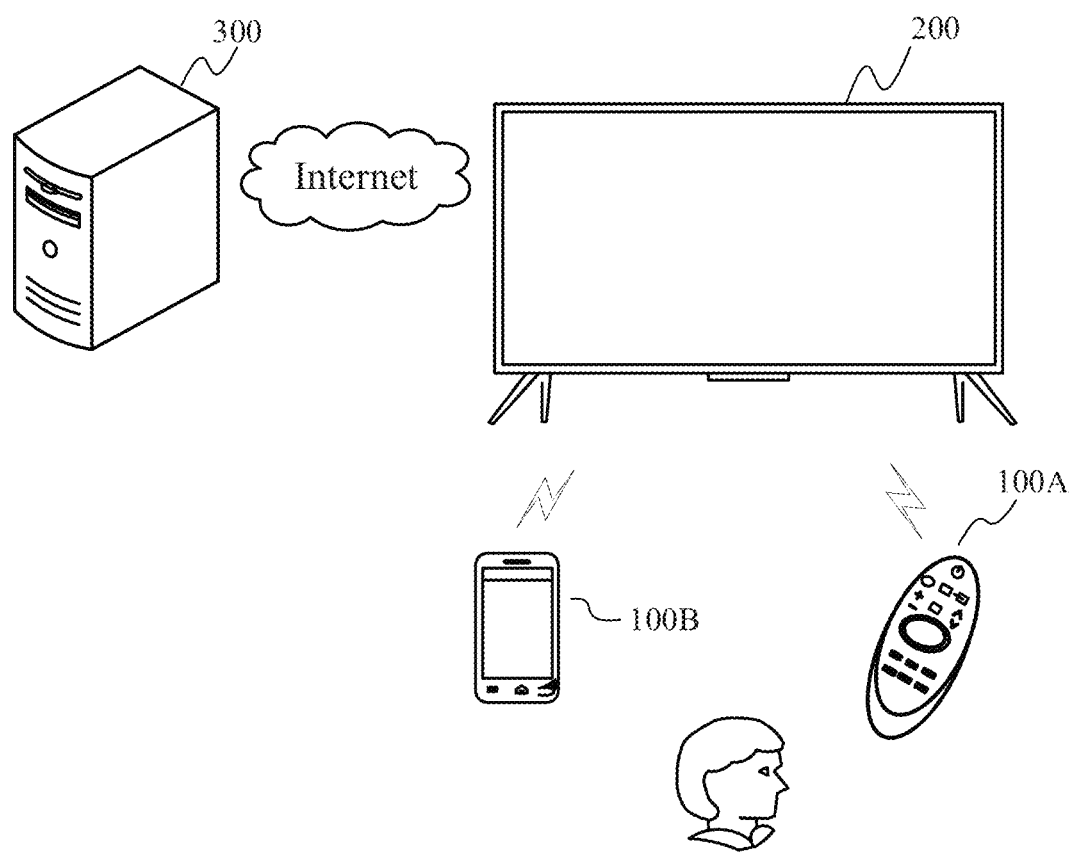
FIG. 1A illustrates a schematic diagram of an operation scene between a display device 200 and a control device 100 according to the embodiments of the present application.

FIG. 1A illustrates a schematic diagram of an operation scene between a display device 200 and a control device 100 according to the embodiments of the present application. As shown in FIG. 1A, the control device 100 may be in communication with the display device 200 in a wired or wireless way.

In some embodiments, the control device 100 is configured to control the display device 200. The control device 100 may receive an operation instruction input from a user, and converts the operation instruction into an instruction that may be recognized and responded by the display device 200 to play an intermediation role in the interaction between the user and the display device 200. For example, the user may operate channel scroll-up and scroll-down keys on the control device 100, while the display device 200 may respond to the corresponding channel scroll-up and scroll-down operations.

In some embodiments, the control device 100 may be a remote controller 100A which may control the display device 200 in wireless or wired ways. For example, the remote controller 100A may control the display device 200 according to an infrared protocol communication, a Bluetooth protocol communication or other short-distance communication.

A user may control the display device 200 by inputting a user instruction through keys, voice input, control panel input and other components on the remote controller 100A. For example, a user may control the display device 200 by inputting corresponding control instructions through a volume-up button or a volume-down button, a channel control key, an up/down/left/right navigation button, a voice input button, a menu button and an on/off button on the remote controller 100A.

In some embodiments, the control device 100 may also be a smart device such as a mobile terminal 100 including a mobile phone, a tablet computer, a computer, a notebook computer, etc. For example, the user may control the display device 200 via applications running on the smart device. Through configuration, the applications may provide the user with various controls on a screen associated with the smart device through a visual user interface (UI).

In some embodiments, the mobile terminal 100B and the display device 200 may install software applications, and communicate with each other through a network communication protocol, to thereby realize one-to-one control operation and data communication. For example, a control instruction protocol between the mobile terminal 100B and the display device 200 may be established, and functions of entity keys set on the remote controller 100A may be realized by operating various function keys or virtual buttons on the user interface provided on the mobile terminal 100B. Alternatively, audio and video contents displayed on the mobile terminal 100B may be transmitted to the display device 200 to realize a synchronous display function.

In some embodiments, the display device 200 may be implemented as a TV, providing intelligent network TV functions such as broadcasting and receiving TV functions, computer support functions, etc. The display device 200 may be a digital TV, a network TV, an intelligent TV or an internet protocol television (IPTV), etc.

In some embodiments, the display device 200 may be a liquid crystal display, an organic light emitting display, a projection display device, etc. In the embodiments of the present application, the type, size and resolution of the display device 200 are not limited.

In some embodiments, the display device 200 is able to communicate data with a server 300 in a variety of communication modes. For example, the display device 200 may be in communication connection with the server 300 via a local area network (LAN), a wireless local area network (WLAN) or other networks. The server 300 may provide various contents and interactions to the display device 200. Exemplarily, the display device 200 may send and receive information, for example, the display device 200 receives electronic program guide (EPG) data, receives software program updates, or accesses remotely stored digital media libraries. The server 300 may include one or more groups of servers which may be one or more types of servers. The server 300 may also provide other network service contents such as video on demand and advertising services.

Figure 1B:
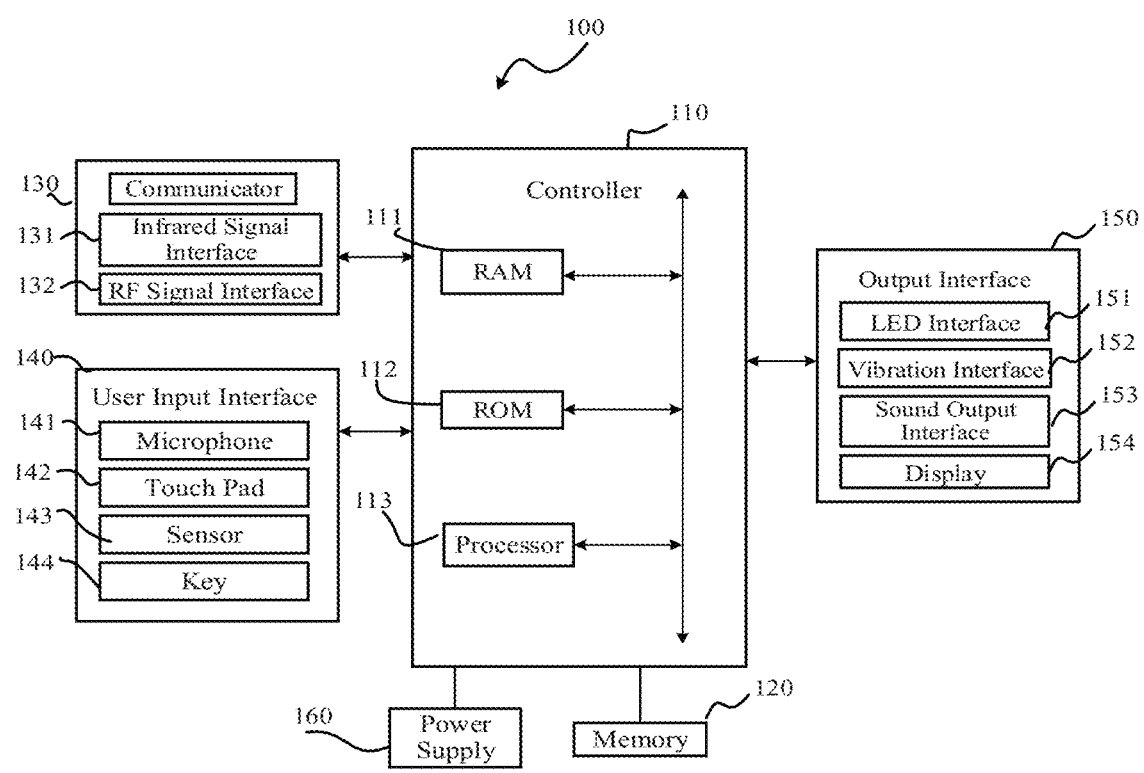
FIG. 1B illustrates a configuration block diagram of the control device 100 in FIG. 1A.

FIG. 1B illustrates a configuration block diagram of a control device 100 according to the embodiments of the present application. The control device 100 includes a controller 110, a memory 120, a communicator 130, a user input interface 140, an output interface 150 and a power supply 160.

The controller 110 includes a random access memory (RAM) 111, a read-only memory (ROM) 112, a processor 113, a communication interface (not shown) and a communication bus (not shown).

The controller 110 is used to control the running and operation of the control device 100, communication cooperation among internal components as well as external and internal data processing functions.

The memory 120 is used to store various operation programs, data and applications for driving and controlling the control device 100 under the control of the controller 110. The memory 120 may store various control signal instructions input from the user.

The communicator 130 may include an infrared signal interface 131 and a radio frequency signal interface 132.

The user input interface 140 may include at least one of a microphone 141, a touch panel 142, a sensor 143, or a key 144, etc., to thereby enable the user to input the user instruction for controlling the display device 200 to the control device 100 through voice, touch, gesture, press and other operations.

The output interface 150 may include an LED interface 151, a vibration interface for generating vibration 152, a sound output interface for outputting sound 153, a display for outputting images 154, etc. The power supply 160 is used to provide running power support for each component of the control device 100 by batteries and related control circuits under the control of the controller 110.

Figure 1C:
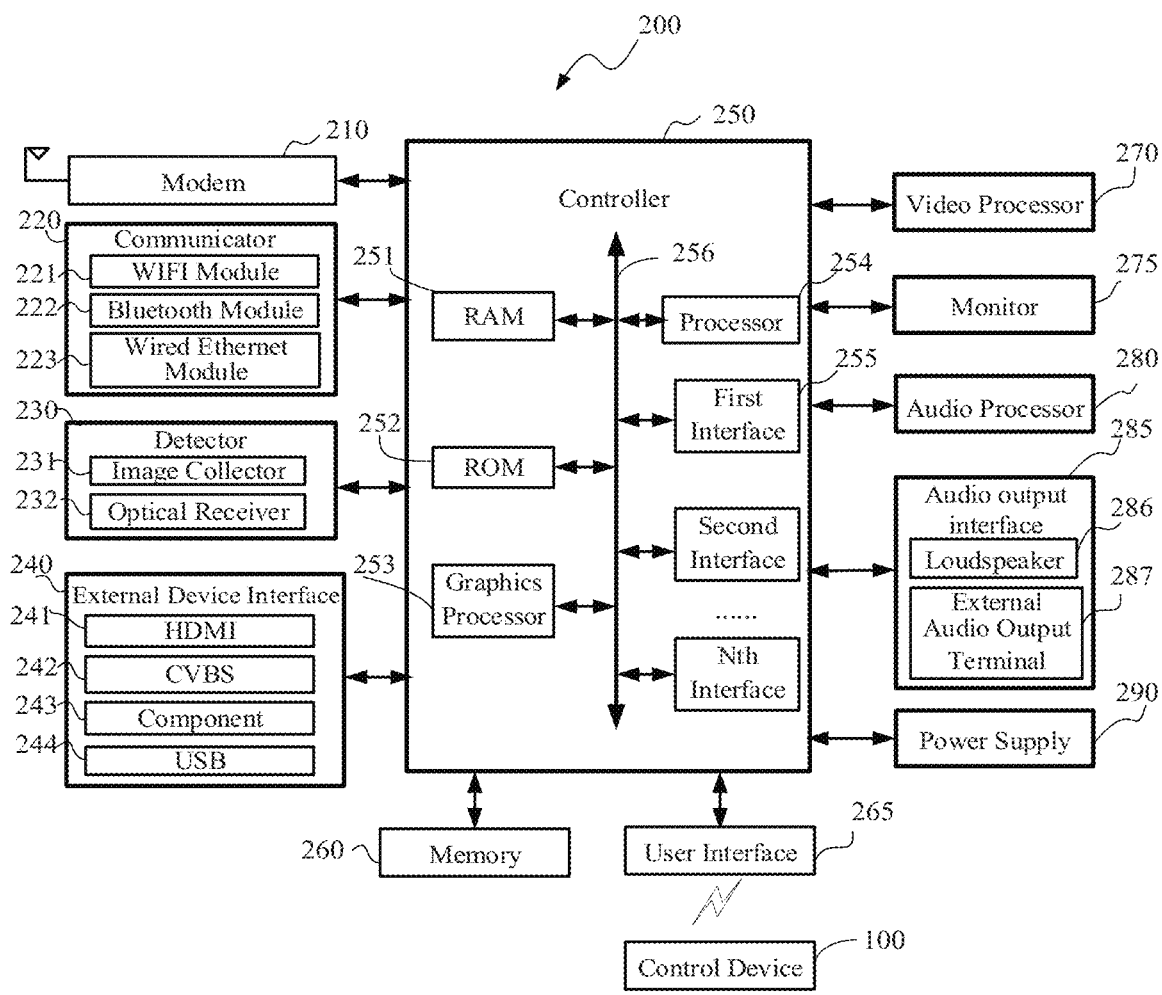
FIG. 1C illustrates a configuration block diagram of the display device 200 in FIG. 1A.

FIG. 1C illustrates a hardware configuration block diagram of a display device 200 according to the embodiments of the present application. The display device 200 may further include a modem 210, a communicator 220, a detector 230, an external device interface 240, a controller 250, a memory 260, a user interface 265, a video processor 270, a display 275, an audio processor 280, an audio input interface 285 and a power supply 290, etc.

The modem 210 may receive radio and television signals in a wired or wireless way and perform modulation and demodulation processing such as amplification, frequency mixing and resonance oscillation.

The modem 210 may respond to a frequency of the TV channel selected by the user and a TV signal carried by the frequency according to users' choice and the control of the controller 250.

The modem 210 may receive signals in many ways according to different broadcasting systems of TV signals, such as terrestrial broadcasting, wired broadcasting, satellite broadcasting or Internet broadcasting, etc, adopt a digital modulation or analog modulation according to different modulation types and demodulate analog and digital signals according to different types of the received TV signals.

In some other exemplary embodiments, the modem 210 may also be provided in an external device such as an external set-top box, etc. In this way, the set-top box outputs a TV signal through modulation and demodulation and inputs the TV signal to the display device 200 through the external device interface 240.

The communicator 220 is a component for communicating with external devices or external servers according to various communication protocol types. The communicator 220 may include a network communication protocol module or a near field communication protocol module such as a WIFI module 221, a Bluetooth communication protocol module 222 and a wired Ethernet communication protocol module 223.

The detector 230 is a component of the display device 200, for collecting signals from or interacting with an external environment. The detector 230 may include an image collector 231 which may be used to collect an external environment scene to self-adapt to the change of display parameters of the display device 200 and to collect user attributes or gestures interacting with the user to realize a function of interaction between the display device and the user. The detector 230 may also include an optical receiver 232 for collecting environmental light intensity to self-adapt to the change of the display parameters of the display device 200, etc.

In some other exemplary embodiments, the detector 230 may also include a temperature sensor. For example, a display device 200 may self-adapt to the adjustment of the display color temperature of an image by sensing the environmental temperature. In some other embodiments, the detector 230 may also include a sound collector such as a microphone, which may be used to receive the users' sound such as a voice signal of a control instruction from the user by controlling the display device 200; or the sound collector may collect environmental sound for identifying the type of an environmental scene, such that the display device 200 may self-adapt to the environmental noise.

The external device interface 240 is a component for the controller 210 to control data transmission between the display device 200 and the external device. The external device interface 240 may be connected with external devices such as set-top boxes, game devices and notebook computers in a wired/wireless way and may receive data such as video signals (such as motion images), audio signals (such as music) and additional information (such as Electronic Program Guide (EPG)) from the external devices.

The external device interface 240 may include any one or more of a high-definition multimedia interface (HDMI) terminal 241, a compound video blanking synchronization (CVBS) terminal 242, an analog or digital component terminal 243, a universal serial bus (USB) terminal 244, a component terminal (not shown in the figure) or a red-green-blue (RGB) terminal (not shown in the figure).

The controller 250 controls the operation of the display device 200 and responds to the users' operation by running various software control programs (such as an operating system and various applications) stored in the memory 260.

The controller 250 includes a random access memory (RAM) 251, a read-only memory (ROM) 252, a graphics processor 253, a CPU 254, a communication interface 255 and a communication bus 256.

The controller 250 may control the overall operation of the display device 200. For example, in response to the received user input instruction for selecting a GUI object displayed on the display 275, the controller 250 may perform operations related to the object selected by the user input instruction.

The object may be any one of optional objects such as hyperlinks or icons. The operation related to the selected object is to, for example, display hyperlinks which lead to pages, documents, images and so on, or execute programs corresponding to the icons. The user input instruction for selecting the GUI object may be an instruction input by various input devices (e.g., a mouse, a keyboard and a touchpad) connected to the display device 200 or a voice instruction corresponding to users' voice.

The memory 260 is used to store various types of data, software programs or applications that drive and control the display device 200 to run.

Figure 1D:
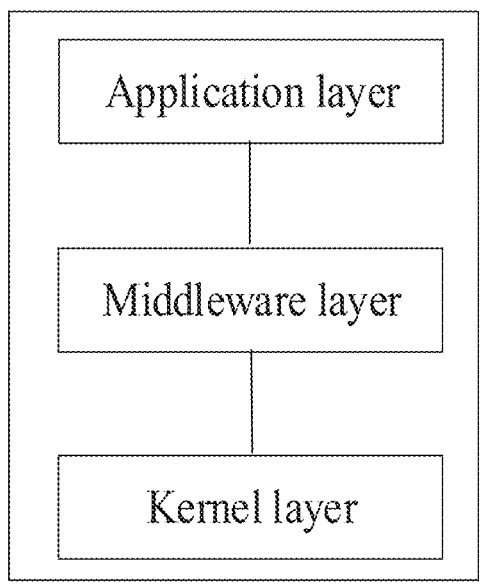
FIG. 1D illustrates a configuration block diagram of architecture of an operating system in a memory of a display device 200 according to the embodiments of the present application.

FIG. 1D illustrates a configuration block diagram of architecture of an operating system in a memory of a display device 200 according to the embodiments of the present application. From top to bottom, the architecture of the operating system includes an application layer, a middleware layer and a kernel layer.

All system built-in applications and non-system applications belong to the application layer which is responsible for direct interaction with users. The application layer may include a plurality of applications such as an NETFLIX application, a setup application and a media center application. These applications may be implemented as Web applications which may be performed based on a WebKit engine and specifically developed and performed based on a Hyper-Text Markup Language (HTML), a cascading style sheet (CSS) and JavaScript.

Here, the HTML is a standard markup language for creating web pages and describes web pages through marked tags. HTML tags are used to describe texts, graphics, animations, sounds, tables, links, etc. Browsers will read HTML documents, interpret the contents of tags in the documents and display the contents in a form of web pages.

The CSS is a computer language for representing HTML file styles. The CSS may be used to define style structures such as fonts, colors and locations. A CSS style may be stored directly in HTML web pages or separate style files to control the styles in the web pages.

JavaScript is a language for Web page programming and may be inserted to HTML pages and interpreted and performed by the browsers. The interaction logic of the Web applications is implemented by JavaScript. JavaScript may realize communication with the kernel layer through a browser and encapsulation of a JavaScript extension interface.

The middleware layer may provide some standardized interfaces to support the operation in various environments and systems. For example, the middleware layer may be implemented as a multimedia and hypermedia information encoding expert group (MHEG) of middleware related to data broadcasting, or implemented as Digital Living Network Alliance (DLNA) middleware of middleware related to communication with external devices, and also implemented as middleware providing a browser environment where each application in the display device runs.

The kernel layer provides core system services such as file management, memory management, process management, network management and system security authority management. The kernel layer may be implemented as a kernel based on various operating systems such as a Linux operating system.

The kernel layer also provides communication between system software and hardware and provides device driver services for various hardware, such as a display driver program for a display, a camera driver program for a camera, a key driver program for a remote controller, a WiFi driver program for a WIFI module, an audio driver program for an audio output interface and a power management driver for a power management (PM) module.

The user interface 265 receives various user interactions. Specifically, the user interface 265 is used to send an input signal from the user to the controller 250 or transmit an output signal from the controller 250 to the user. Exemplarily, the remote controller 100A may send input signals such as power on/off signals, channel selection signals and volume adjustment signals input from the user to the user interface 265 and then transmit the input signals from the user interface 265 to the controller 250; or the remote controller 100A may receive output signals such as audio, video or data output from the user interface 265 after being processed by the controller 250 and display the received output signals or output the received output signals in an audio or vibration form.

In some embodiments, a user may input a user instruction to the GUI displayed on the display 275, and the user interface 265 receives the user input instruction through the GUI. To be exact, the user interface 265 may receive the user input instruction for controlling the location of a selector in the GUI to select different objects or items.

Alternatively, the user may input the user instruction by inputting specific sounds or gestures, and then, the user interface 265 may recognize the sounds or gestures through sensors to receive the user input instruction.

The video processor 270 is used to receive external video signals. Video data processing such as decompression, decoding, scaling, noise reduction, frame rate conversion, resolution conversion and image synthesis are performed according to a standard coding and decoding protocol of the input signals, so that the video signals displayed or played directly on the display 275 may be obtained.

The display 275 is used to receive image signals output from the video processor 270 to display videos, images and menu control interfaces. For example, the display may display a video from a broadcast signal received by the modem 210, or a video input from the communicator 220 or the external device interface 240 and also an image stored in the memory 260. In addition, the display 275 displays the user interface (UI) that is generated in the display device 200 and used to control the display device 200.

The display 275 may include a display screen component for presenting frames and a driving component for driving image display. Alternatively, if the display 275 is a projection display, the display 275 may also include a projection apparatus and a projection screen.

The audio processor 280 is used to receive external audio signals and perform decompression and decoding according to the standard coding and decoding protocol of the input signals as well as audio data processing such as noise reduction, digital-to-analog conversion and amplification to obtain audio signals that may be played in a speaker 286.

For example, the audio processor 280 may support various audio formats such as MPEG-2, MPEG-4, advanced audio coding (AAC) and high efficiency AAC (HE-AAC).

The audio output interface 285 is used to receive audio signals output from the audio processor 280. For example, an audio output interface may output an audio in the broadcast signal received via the modem 210, an audio input via the communicator 220 or the external device interface 240 and an audio stored in the memory 260. The audio output interface 285 may include the speaker 286 or an external audio output terminal 287 such as a headset output terminal which is output to a sound production module of the external device.

In some other exemplary embodiments, the video processor 270 may include one or more chips. The audio processor 280 may also include one or more chips.

In some other exemplary embodiments, the video processor 270 and the audio processor 280 may either be an individual chip or be integrated with the controller 250 into one or more chips.

The power supply 290 is used to supply power input by an external power supply as power supply support to the display device 200 under the control of the controller 250. The power supply 290 may be either a built-in power supply circuit installed inside the display device 200 or a power supply installed outside the display device 200.

Figure 2:
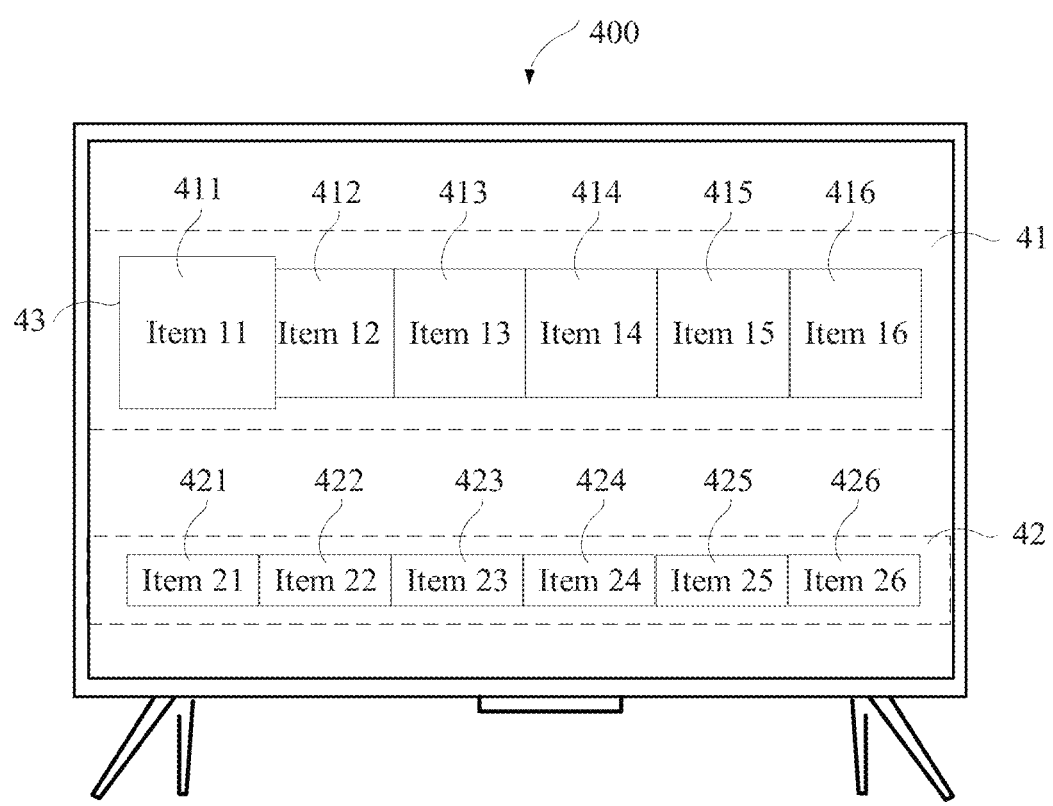
FIG. 2 illustrates a first schematic diagram of a GUI400 provided by a display device 200 according to the embodiments of the present application.

FIG. 2 illustrates a first schematic diagram of a GUI400 provided by a display device 200 according to the embodiments of the present application.

As shown in FIG. 2, the display device may provide the GUI400 to the display. The GUI400 includes a plurality of display areas that provide different image contents. Each display area includes one or more different items arranged. For example, items 411-416 are arranged in a first display area 41 and items 421~426 are arranged in a second display area 42. The GUI400 also includes a selector 43 for indicating any selected item. A user may select different items by operating the input of the control device to move the location of the selector 43 in the GUI400 or the location of each item in the GUI400. For example, in FIG. 2, the selector 43 indicates that the item 411 in the first display area 41 is selected.

It shall be noted that, in the embodiments of the present application, an item refers to a visual object displayed in various display areas of the GUI in the display device 200 to represent corresponding contents such as icons, thumbnails, video clips and links. These items may provide users with various traditional program contents received through data broadcasting as well as various applications and service contents provided by content manufacturers.

In some embodiments, an item may represent an image content or video clip of a movie or TV series, an audio content of music, application, or other history information of user access contents. If the item is a movie or TV series, it may be displayed as a poster of the movie or TV series and a video clip dynamic image of a movie or TV series trailer. If the item is music, it may be displayed as a poster of a music album. If the item is an application, it may be displayed as an icon of the application, or when the application is performed, the item may be displayed as a content screenshot of the application program captured during recent execution. If the item is a user access history, it may be displayed as a content screenshot during the recent execution.

In some embodiments, an item may represent an interface or a set of interfaces for connecting the display device 200 and external devices, or names of external devices connected to the display device, etc., such as a signal source input interface set, or an HDMI interface, a USB interface and a PC terminal interface.

The presentation forms of the items usually vary. For example, the items may include text contents and/or images for displaying thumbnails related to the text contents, or text-related video clips. Alternatively, items may be texts and/or icons of the applications.

It shall also be noted that the selector 43 indicates that any one of the items has been selected, for example, the selected item may be regarded as a focus object.

On one hand, according to a user input through the control device 100, a display focus object in the display device 200 may be controlled to move, to select or control the items. For example, the user may select and control the items by controlling the movement of the focus object among the items through a navigation key on the control device 100.

On the other hand, according to the user input through the control device 100, the movement of the items displayed in the display device 200 may be configured to control the focus object to select or control the items. For example, the user may control the items to move left and right all at once through the navigation key on the control device 100, so that the focus object may select and control the items while keeping the location of the focus object unchanged.

The identification form of the selector 43 usually varies. For example, in FIG. 2, the location of the focus object corresponding to the selector 43 is achieved or identified by enlarging the item. Optionally, in FIGS. 5B~5E, the location of the focus object corresponding to the selector 43 is achieved or identified by setting the background color of the item. Optionally, the location of the focus object corresponding to selector 43 may be identified by changing the border line, size, color, transparency, outline and/or font of a text or an image of the focus object.

FIGS. 3A~3H exemplarily and respectively show schematic diagrams of a GUI400 or a GUI500 provided by a display device 200 according to the embodiments of the present application.

Figure 3A:
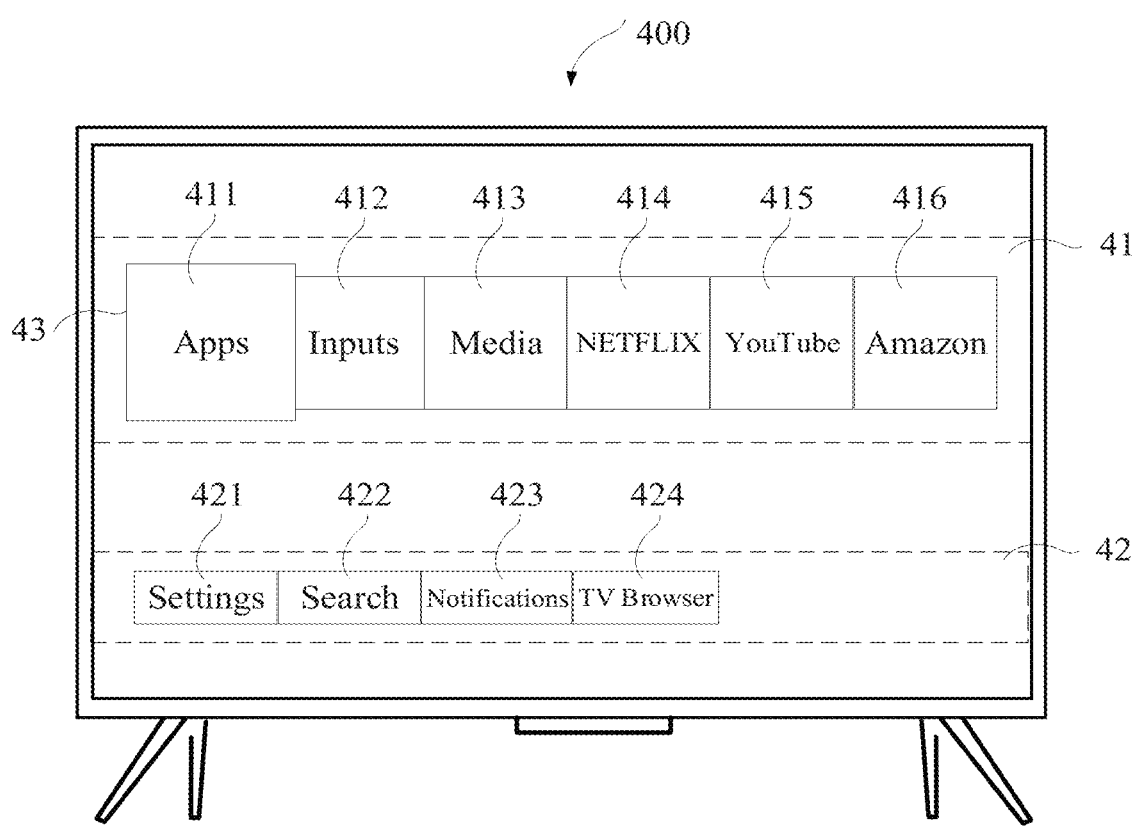
FIG. 3A illustrates a second schematic diagram of the GUI400 provided by a display device 200 according to the embodiments of the present application.

As shown in FIG. 3A, the GUI400 may be implemented as a home page of the display device. The first display area 41 includes items 411 to 416 that provide common service contents for users. For example, the items 411 to 416 are Apps (installed applications), Input (input interface), Media (media center applications), NETFLIX (a video application), YouTube (a video application), Amazon (a shopping application) respectively. The second display area 42 includes items 421~424 that provide quick service contents for users. For example, the items 421 to 424 are Settings, Search, Notifications (Notification Center Application) and TV Browser respectively. The current selector 43 indicates that the Apps 411 is selected.

In addition, since the system language set by the display device after the first startup or the system language set based on user input after the start of the display device is English, a GUI content provided by the display device is also English.

Figure 3B:
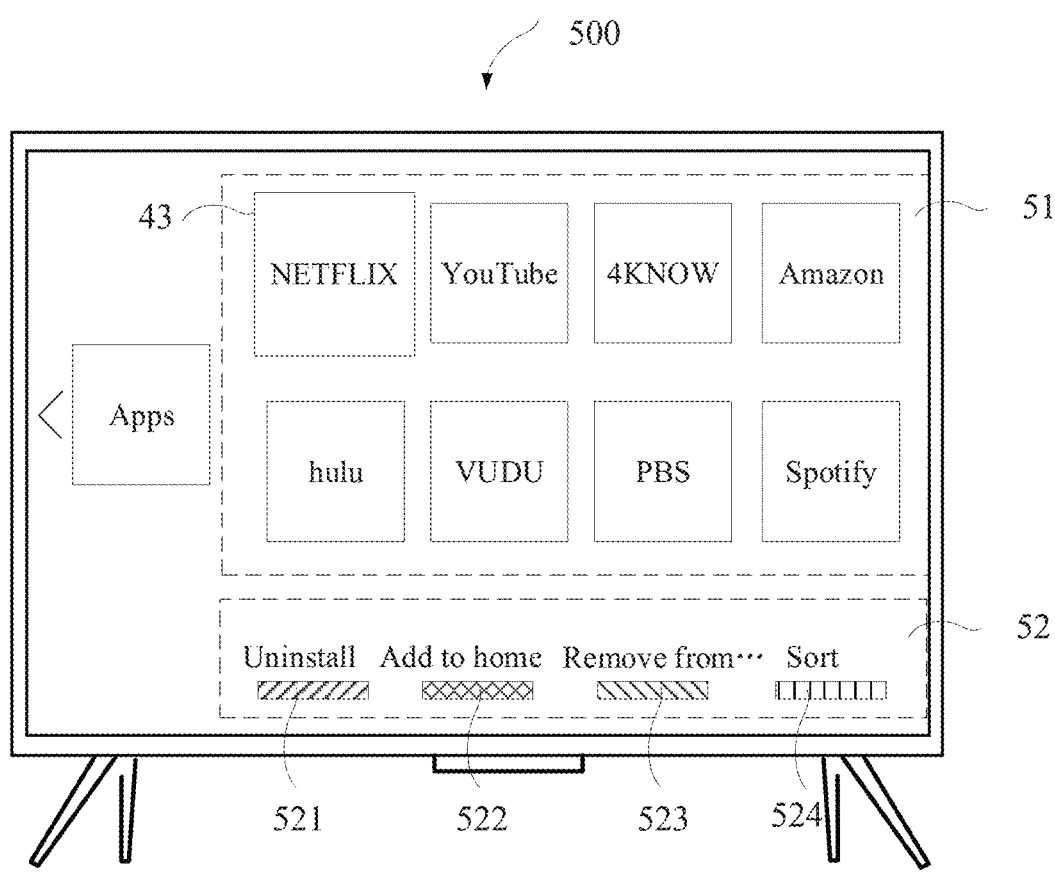
FIG. 3B illustrates a first schematic diagram of a GUI500 provided by a display device 200 according to the embodiments of the present application.

In FIG. 3A, when the user presses a confirmation key on the control device 100, as shown in FIG. 3B, the display device displays the GUI500 associated with the Apps 411 in response to the input instruction for activating the Apps 411. The GUI500 includes a content display area 51 for providing information of a plurality of installed applications and a menu display area 52 of at least one menu item for performing functions associated with the plurality of installed applications.

The content display area 51 includes a plurality of installed applications, such as NETFLIX, YouTube and 4KNOW for users to visit. For example, the selector 43 indicates that the NETFLIX application is selected. When the user presses the confirmation key on the control device, the display device may access related services provided by the NETFLIX application in response to instructions for activating the NETFLIX application.

The menu display area 52 includes at least one menu item for performing related functions on a plurality of installed applications in the content display area 51, such as Uninstall 521 (e.g., uninstalling a certain application from the display device), Add to home 522 (e.g., adding an application from the GUI500 to the first display area (i.e., the home page of the display device)) in the GUI400, Remove from home 523 (e.g., removing an application from the first display area (i.e., the home page of the display device) in the GUI400) and Sort 524 (e.g., sorting a plurality of installed applications in the content display area 51 according to a installation name or installation time), for the user to input an operation intention for performing functions associated with the plurality of applications.

Here, the menu item in the menu display area 52 may be represented by a menu item name and a menu item icon. For example, an Uninstall 521 menu item corresponds to the name of Uninstall and the icon of an R (red) rectangular bar; an Add to home 522 menu item corresponds to the name of Add to home and the icon of a G (green) rectangular bar; a Remove from home 523 menu item corresponds to the name of Remove from home and the icon of a Y (yellow) rectangular bar; and a Sort 524 menu item corresponds to the name of Sort and the icon of a B (blue) rectangular bar.

In addition, in a menu item, the menu item name and the menu item icon are arranged from top to down, and the menu item name is arranged in a left-aligned manner with the menu item icon. For example, the menu item name Uninstall is arranged above the red rectangle bar of the menu item icon, and the left end of the menu item name Uninstall aligns with the left end of the red rectangle bar of the menu item icon. The menu items are arranged from left to right according to a preset display location. For example, the menu items 521~524 are arranged in a row according to the preset display location in the menu display area 52.

It shall be noted that in order to select and perform the relevant functions corresponding to the image content service provided by the display device, the display device provides a plurality of menu items for selecting functions, and the control device configured to control the display device may include a plurality of color keys for selecting functions, so that the user may be prompted to cause the display device to perform the functions associated with menu items corresponding to the color keys by controlling the color keys on the control device.

Here, there is a mapping relationship between the function corresponding to the menu item and the color key on the control device. Specifically, when the display device receives key event values corresponding to the color keys on the control device input from the user, the display device may perform the function operations corresponding to the key event values based on the mapping relationship, so that the color keys on the control device may be visually matched with the functions provided by the menu items.

For example, the menu display area 52 in the GUI500 shown in FIG. 3B provides menu items 521~524 including Uninstall, Add to home, Remove from home and Sort functions, and the corresponding menu icons of the menu items 521~524 are arranged in the order of R, Q Y and B colors to allow the above predetermined functions to be performed or selected according to the application services provided in the content display area 51. The color keys are arranged in the order of R, Q Y and B colors on the control device 100 as shown in FIG. 4, so that users may operate the color keys on the control device to enable the display device to perform the desired functions associated with the menu items 521~524.

Figure 3C:
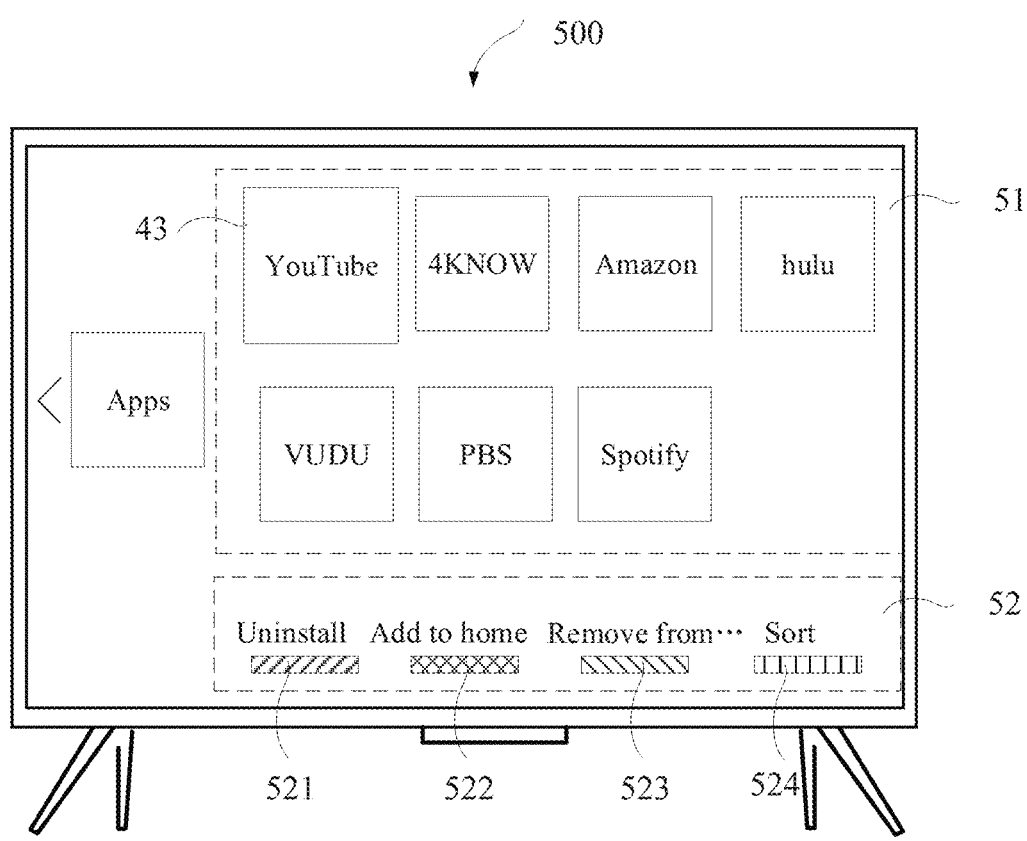
FIG. 3C exemplarily shows a second schematic diagram of the GUI500 provided by a display device 200 according to the embodiments of the present application.
Figure 4:
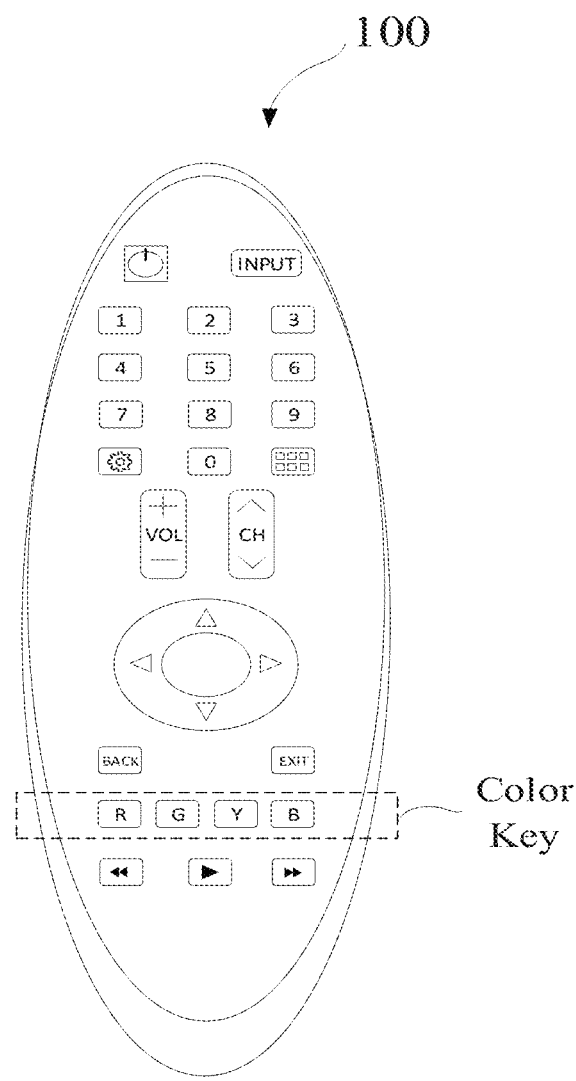
FIG. 4 illustrates a schematic diagram of a control device 100 according to the embodiments of the present application.

With reference to FIGS. 3B and 4, when a user desires to uninstall the NETFLIX application from the display device, the user may press a red key on the control device (the color of the key corresponds to the color of the menu item icon with the uninstall function provided by the menu item 521), the display device may receive the key event value of the key, the mapping information of "R-Uninstall function" is extracted from the display device, and then, the function of uninstalling the NETFLIX application is performed. In the GUI500 as shown in FIG. 3C, the content display area 51 does not display the NETFLIX application, but only displays the remaining applications.

Figure 3D:
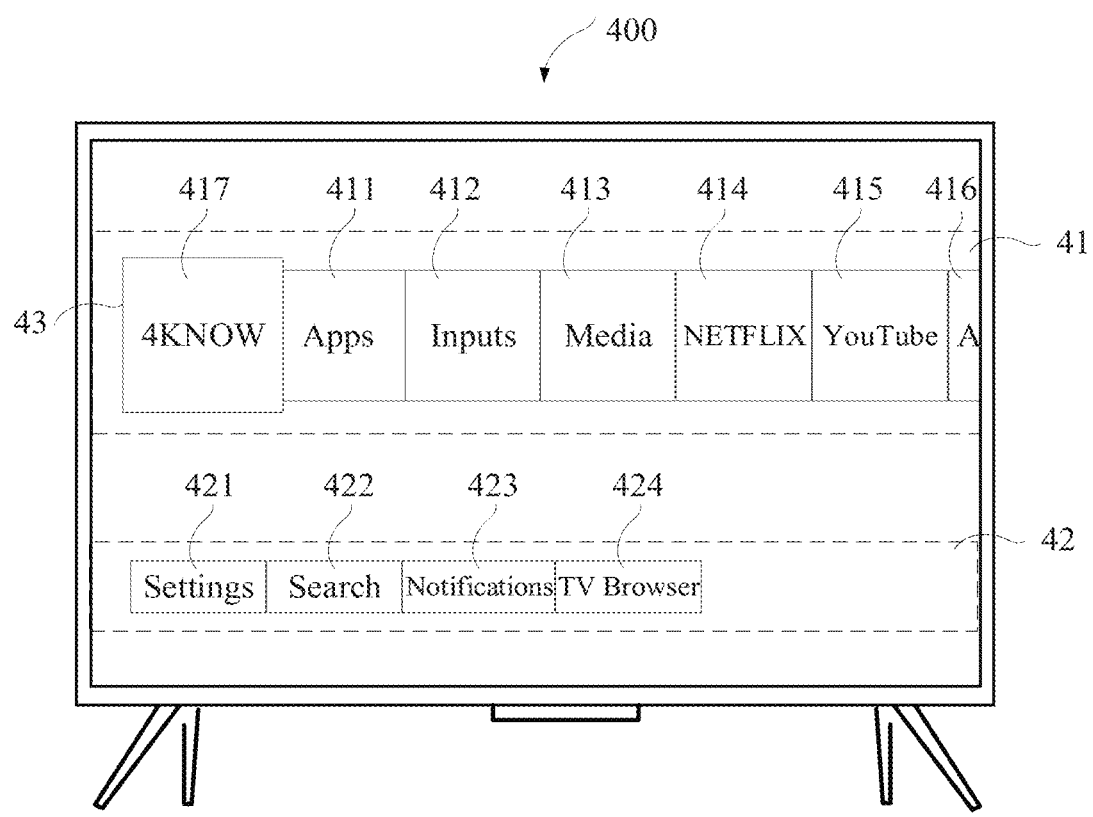
FIG. 3D illustrates a third schematic diagram of the GUI400 provided by a display device 200 according to the embodiments of the present application.

With reference to FIGS. 3B and 4, when a user desires to add a 4KNOW application to the home page, the user may press a green key on the control device (the color of the key corresponds to the color of the menu item icon with the Add to home function provided by the menu item 522) when the selector 43 indicates that the 4KNOW application is selected, the display device may receive the key event value of the key, the mapping information of "G-Add to home function" is extracted from the display device, and then, the function of adding 4KNOW application to the home page is performed. In the GUI400 as shown in FIG. 3D, the first display area 41 displays the item 417 corresponding to the added 4KNOW application and the original items 411~416 at the same time.

Figure 3E:
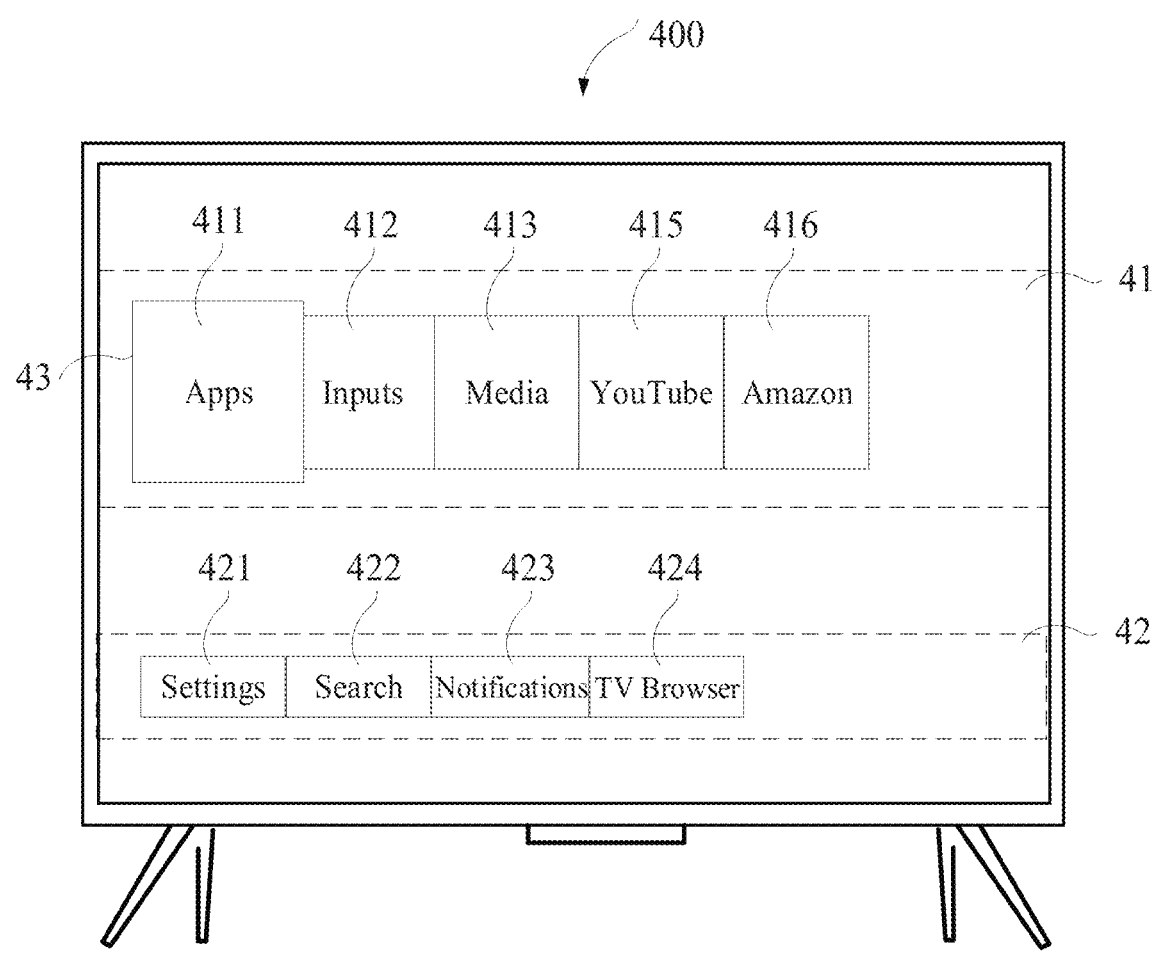
FIG. 3E illustrates a fourth schematic diagram of the GUI400 provided by a display device 200 according to the embodiments of the present application.

With reference to FIGS. 3B and 4, when a user desires to removing the NETFLIX application from the display device home page, the user may press a yellow key on the control device (the color of the key corresponds to the color of the menu item icon with the Remove function from the home page provided by the menu item 523), the display device may receive the key event value of the key, the mapping information of "Y-Remove from home function" is extracted from the display device, and then, the function of removing the NETFLIX application from the home page is performed. In the GUI400 as shown in FIG. 3E, the first display area 41 does not display the item 414 corresponding to the NETFLIX application, but only displays remaining items 411~413 and 415~416.

Figure 3F:
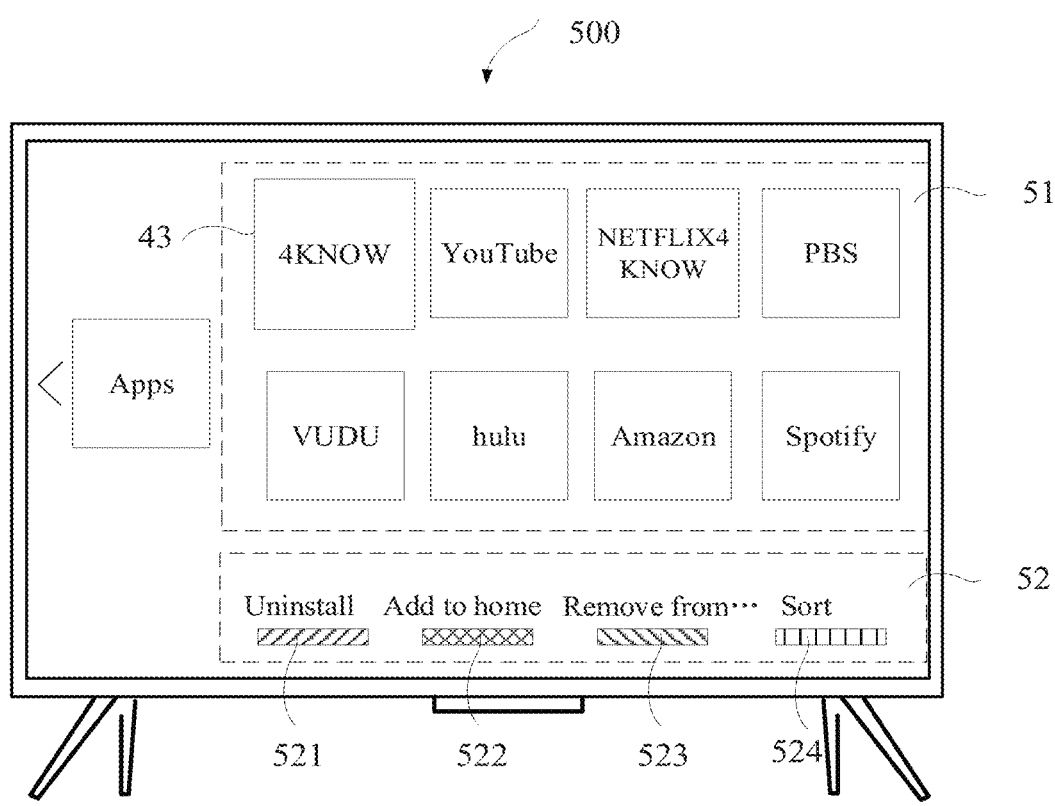
FIG. 3F illustrates a third schematic diagram of the GUI500 provided by a display device 200 according to the embodiments of the present application.

With reference to FIGS. 3B and 4, when a user desires to sort the installed applications in the content display area, the user may press a blue key on the control device (the color of the key corresponds to the color of the menu item icon of the Sort function provided by the menu item 524), the display device may receive the key event value of the key, the mapping information of "B-Sort function" is extracted from the display device, and then, the function of sorting applications according to the installation time is performed. In the GUI500 as shown in FIG. 3F, the content display area 51 displays the reordered applications.

Thus, in the case of providing the image content on the display, after the user presses the color key with the desired function on the control device, the display device may receive the key event value of the color key, search and perform the function corresponding to the received key event value from the mapping information. It is advantageous to visually correspond the color of the color key on the control device to the menu items with functions associated with the image content to perform the desired function.

It shall also be noted that the number, name, color, shape and arrangement order of the menu items provided in the menu display area may be set by default according to the content.

For example, for the content display area 51 in the GUI500 as shown in FIG. 3B, a background server of the display device configures two menu items, namely the menu item 521 with the name of Uninstall and the menu item icon of the red rectangular bar, and the menu item 522 with the name of Add to home and the menu item icon of the green rectangular bar. At this time, as shown in FIG. 3Q the menu items 521~522 may be displayed normally on display locations shown in FIG. 3B, and the menu items 523~524 may be displayed differently from the menu items 521~522 according to the display locations shown in FIG. 3B. For example, the menu item names and the menu item icons of the menu items 523~524 are all set in gray, the menu item icons of the menu items 523~524 are displayed while the menu item names are not displayed, or the menu item names and the menu item icons of the menu items 523~524 are not displayed, so that the user is prompted that the current menu display area only provides the menu items 521~522, but not the menu items 523~524.

The number, name, color, shape and arrangement order of the menu items provided in the menu display area may also be set according to a configuration input from the user.

For example, based on the user input, two menu items are configured for the content display area 51 in the GUI500 as shown in FIG. 3B, namely the menu item 521 with the name of Uninstall and the menu item icon of the red rectangular bar as well as the menu item 523 with the name of Rename (such as an application for renaming an application according to a user's definition) and the menu item icon of the yellow rectangular bar.

Figure 3G:
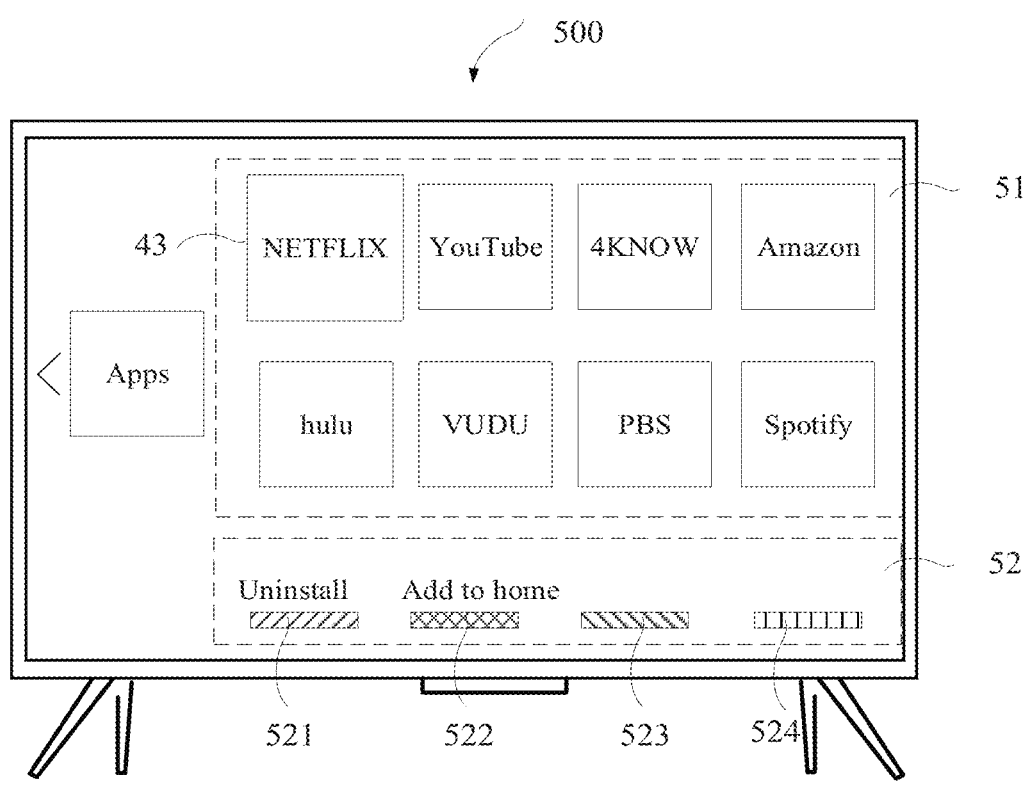
FIG. 3G illustrates a fourth schematic diagram of the GUI500 provided by a display device 200 according to the embodiments of the present application.
Figure 3H:
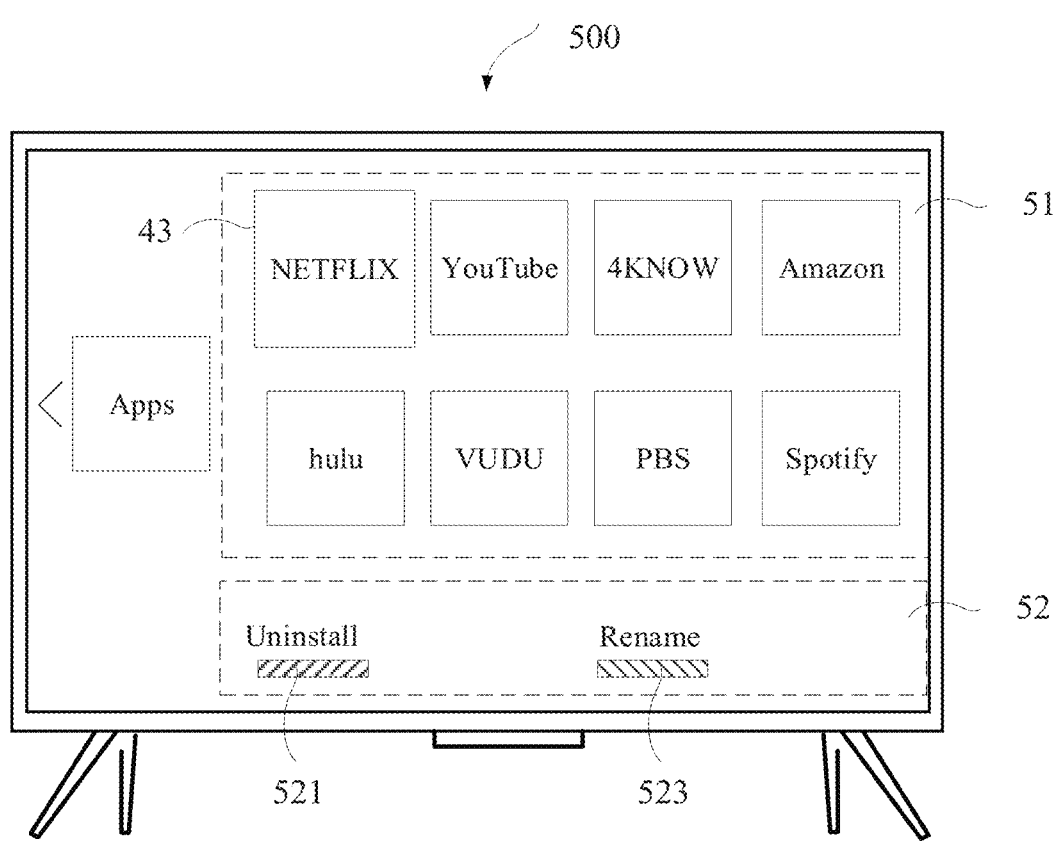
FIG. 3H illustrates a fifth schematic diagram of the GUI500 provided by a display device 200 according to the embodiments of the present application.

At this time, as shown in FIG. 3H, the menu items 521 and 523 may be displayed normally according to the display locations as shown in FIG. 3B, and the menu items 522 and 524 may be displayed differently from the menu items 521 and 523 according to the display locations as shown in FIG. 3B. For example, the menu item names and icons of the menu items 522 and 524 are all set in gray, the menu item icons of the menu items 522 and 524 are displayed while the menu item names of the menu items 522 and 524 are not displayed, or the menu item names and the menu item icons of the menu items 523~524 are not displayed, so that the user is prompted that the current menu display area only provides the menu items 521 and 523, but not the menu items 522 and 524.

In some embodiments, as shown in FIGS. 5A~5E, the display device may modify its setting language based on user input, thereby changing the language corresponding to the image content provided by the display device and/or the menu items required to perform the functions of the image content, so that the needs of different users for the language may be met.

Figure 5A:
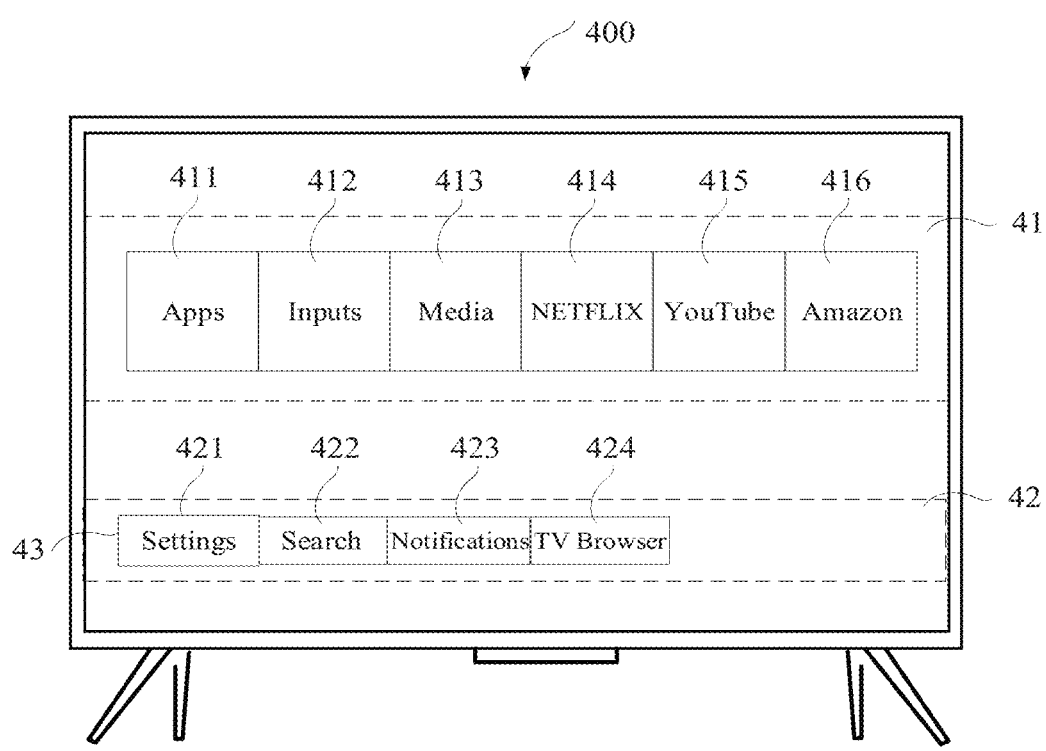
FIG. 5A illustrates a fifth schematic diagram of the GUI400 provided by a display device 200 according to the embodiments of the present application.
Figure 5B:
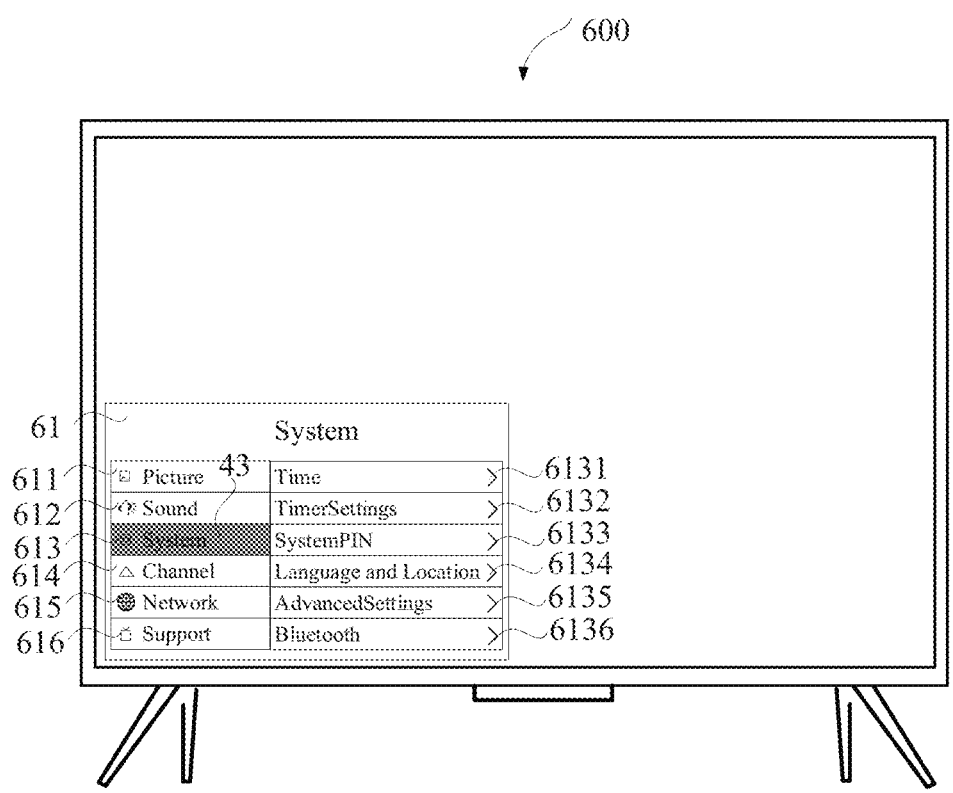
FIG. 5B illustrates a first schematic diagram of a GUI600 provided by a display device 200 according to the embodiments of the present application.

Specifically, in FIG. 3A, when the user presses a navigation button for going down on the control device, as shown in FIG. 5A, the display device controls the selector 43 to indicate that Settings 421 is selected in the second display area 42 in response to an instruction associated with the navigation button for going down. Next, when the user presses the confirmation key on the control device, as shown in FIG. 5B, the display device displays the GUI600 associated with Settings 421 in response to the input instruction for activating Settings 421. The GUI600 includes a menu page 61 which includes items 611~616 such as Picture, Sound, System, Channel, Network and Support. The selector 43 indicates that System 613 is selected, and System 613 provides its corresponding sub-menus, such as items 6131~6136, namely Time, TimeSettings, SystemPIN, Language and Location, AdvancedSettings and Bluetooth respectively.

Figure 5C:
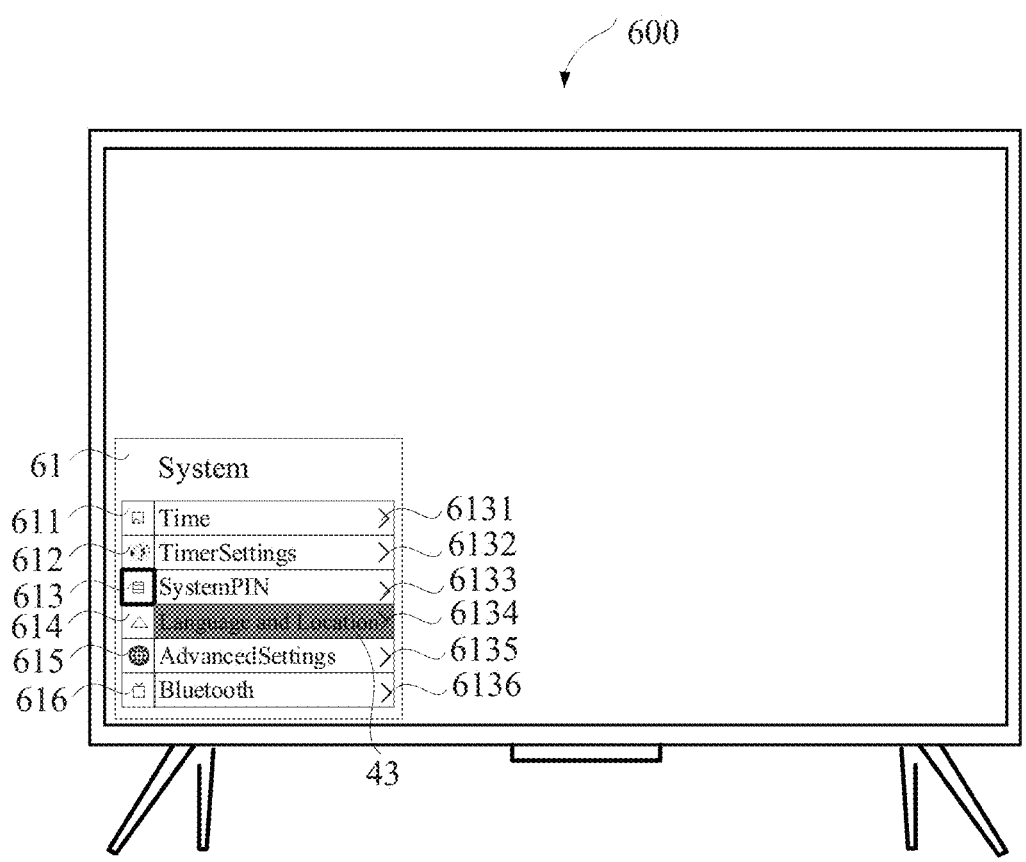
FIG. 5C illustrates a second schematic diagram of the GUI600 provided by a display device 200 according to the embodiments of the present application.

In FIG. 5B, when the user repeatedly presses the navigation button on the control device, as shown in FIG. 5C, the display device controls the selector 43 to indicate that Language and location 6134 is selected in response to an instruction associated with the navigation button. Next, when the user presses the confirmation key on the control device, as shown in FIG. 5D, the display device displays the sub-menus corresponding to Language and location 6134, such as items 6134-1 to 6134-2, namely Language and Location respectively, in response to the input instruction for activating Language and location 6134.

Figure 5D:
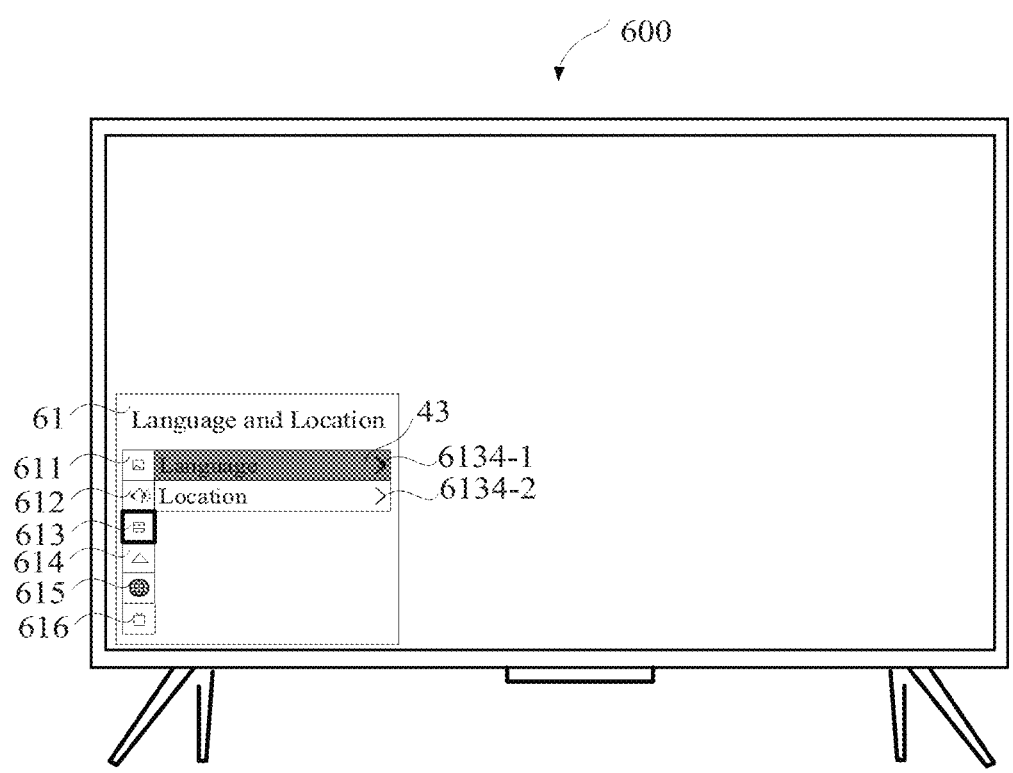
FIG. 5D illustrates a third schematic diagram of the GUI600 provided by a display device 200 according to the embodiments of the present application.
Figure 5E:
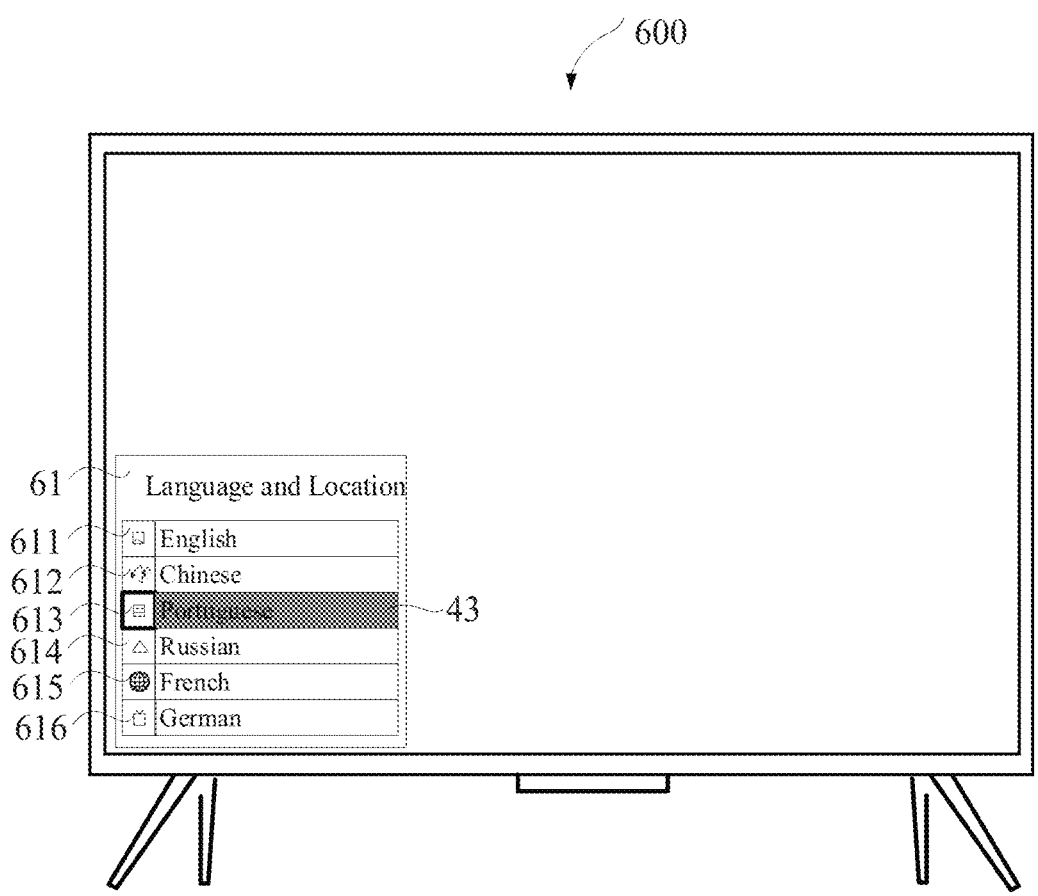
FIG. 5E illustrates a fourth schematic diagram of the GUI600 provided by a display device 200 according to the embodiments of the present application.

In FIG. 5D, when the user presses the confirmation key on the control device, as shown in FIG. 5E, the display device may display the sub-menus corresponding to the Language 6134-1, such as English, Chinese, Portuguese, Russian and French, in response to the input instruction for activating Language 6134-1. Next, when the user presses the confirmation key on the control device, the display device may change the current system language of the display device from English to Portuguese in response to the input instruction for selecting Portuguese.

Figure 6A:
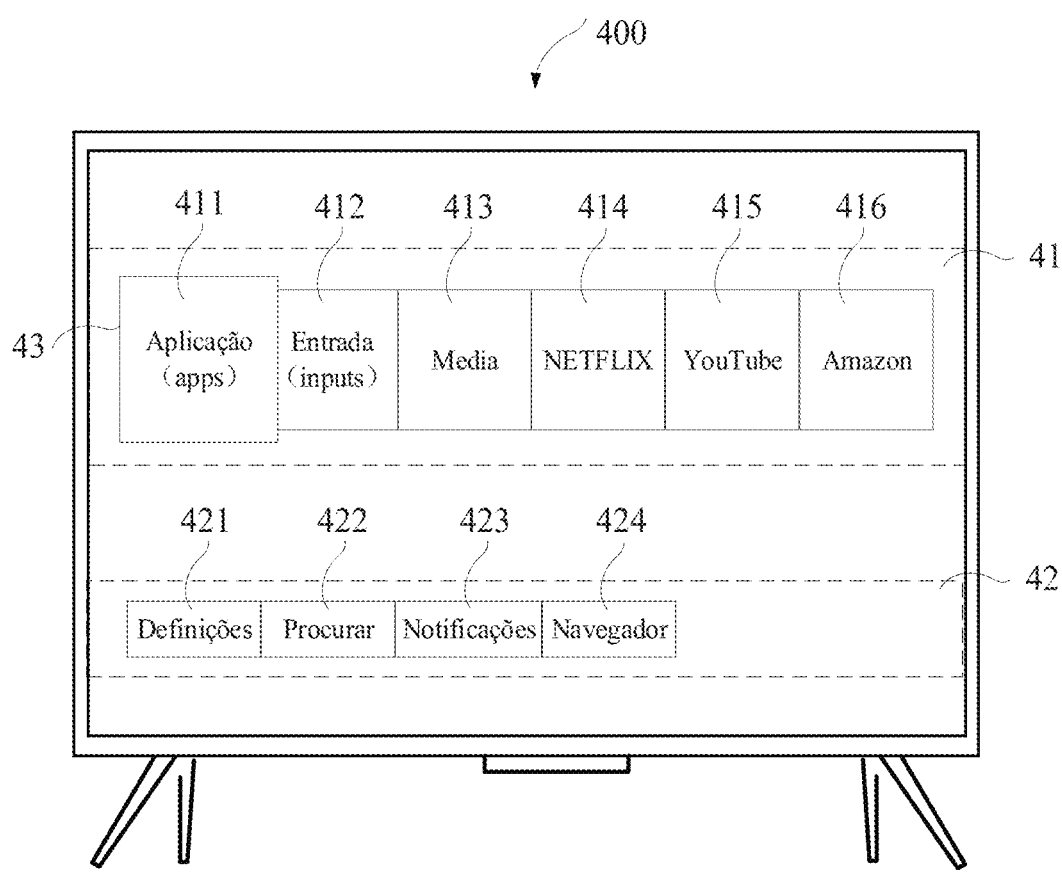
FIG. 6A illustrates a sixth schematic diagram of the GUI400 provided by a display device 200 according to the embodiments of the present application.

Then, when the user presses a back button on the control device, the display device may display the GUI400 as shown in FIG. 6A in response to the input instruction for exiting from Settings 421, where the language corresponding to the image contents in the home page of the display device provided by the GUI400 is switched to Portuguese. For example, the item 411 is displayed as Aplicação (apps) and the item 421 is displayed as Definições (settings).

Figure 6B:
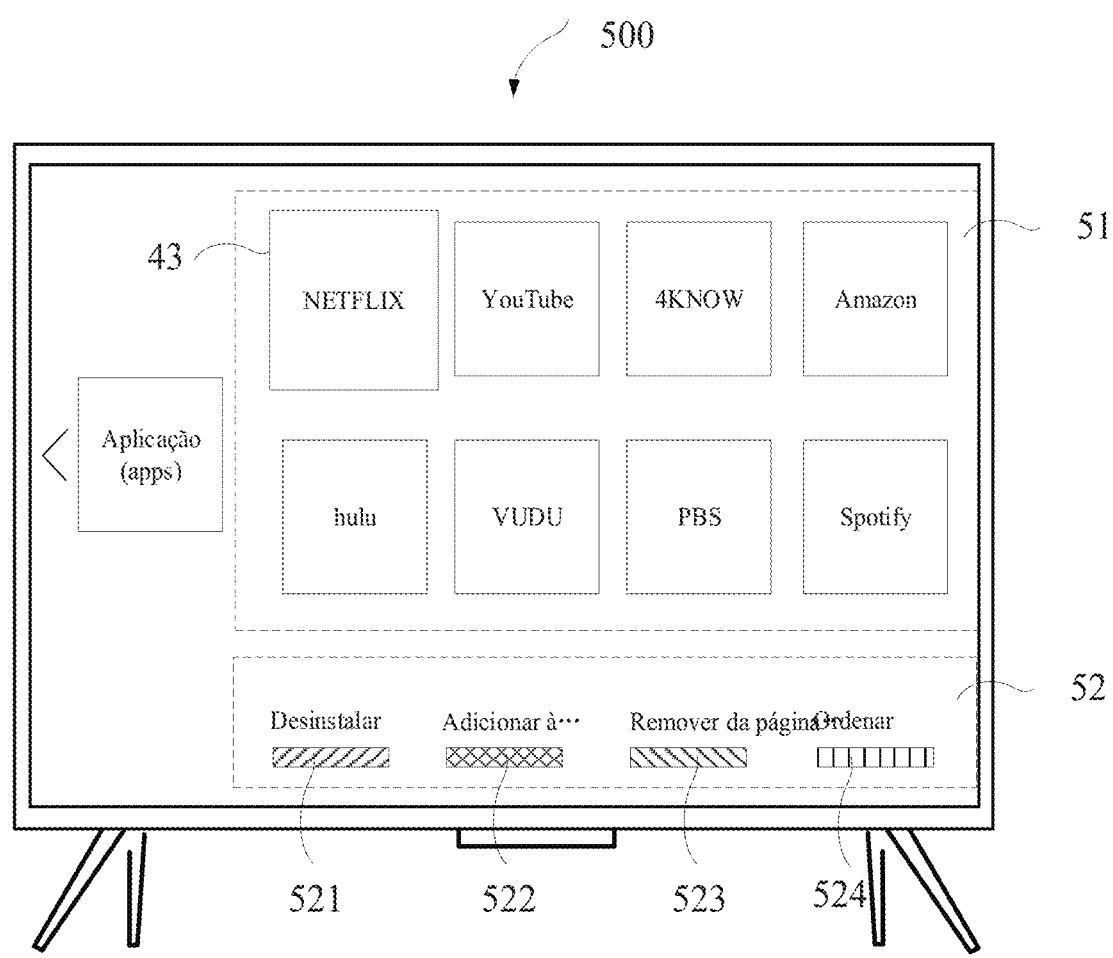
FIG. 6B illustrates a sixth schematic diagram of the GUI500 provided by a display device 200 according to the embodiments of the present application.

In FIG. 6A, when the user presses the confirmation key on the control device, as shown in FIG. 6B, the display device displays the GUI500 associated with Aplicação (Apps) 411 in response to the input instruction for activating Aplicação (Apps) 411, where the languages corresponding to the contents in the content display area 51 and the menu display area 52 provided by the GUI500 are switched to Portuguese. For example, in the menu display area 52, the menu item names corresponding to the menu items 521~524 are displayed as Desinstalar, Adicionar à página Principal, Remover da página Principal and Ordenar respectively.

It may be seen from FIGS. 3B and 6B that in the menu display area, because the same menu item name in English and Portuguese may have different text widths while the display locations of the menu item icons are fixed and the menu item names are arranged in a left-aligned manner with the menu item icons, the display of the menu items in the menu display area is disordered, affecting the users' visual experience. For example, as shown in FIG. 3B, if the menu item name of the menu item 523 is fully displayed, it will exceed the icon of the menu item by a large part, so the display mode of omitting part of the text is adopted. As shown in FIG. 6B, if the menu item name of the menu item 523 is fully displayed, it will exceed the icon of the menu item by a large part, even extend to the menu item icon of the menu item 524, and the menu item name of the menu item 523 overlaps with the menu item name of the menu item 524, which causes inconvenience to users.

FIGS. 7A~7D exemplarily and respectively show schematic diagrams of a GUI700 or a GUI800 provided by a display device 200 according to the embodiments of the present application.

Figure 7A:
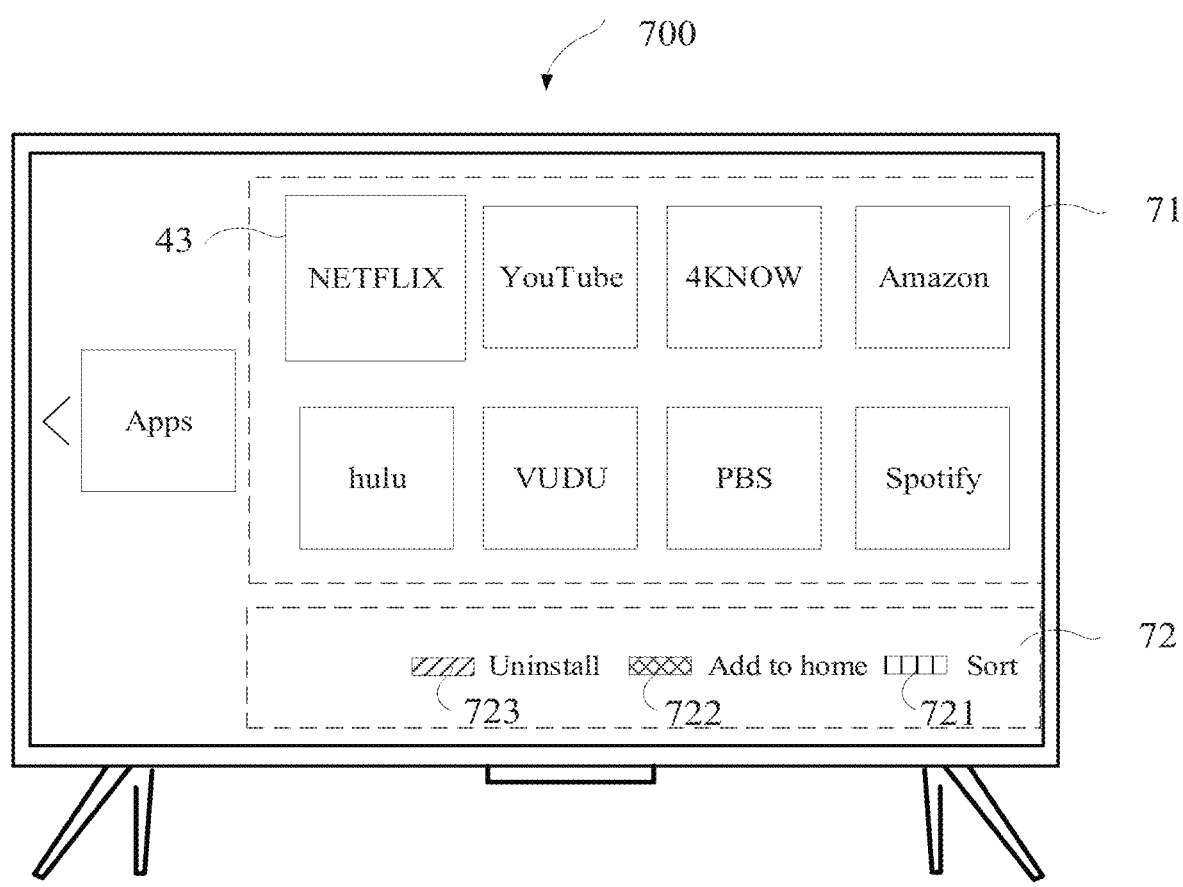
FIG. 7A illustrates a first schematic diagram of a GUI700 provided by a display device 200 according to the embodiments of the present application.

FIG. 7A shows the GUI700 associated with Apps 411 in the GUI400 as shown in FIG. 3A. The GUI700 includes a content display area 71 providing information of a plurality of installed applications and a menu display area 72 of at least one menu item for performing functions associated with the plurality of installed applications.

The content display area 71 includes a plurality of installed applications such as NETFLIX, YouTube and 4KNOW for users to access. In the menu display area 72, according to the default configuration, three menu items for performing related functions on a plurality of installed applications in the content display area 51 are provided, such as Sort 721 (for example, sorting a plurality of installed applications in the content display area 71 according to an installing names or installing time), Add to home 722 (for example, adding an application from the GUI700 to the first display area (i.e. the home page of the display device) in the GUI400) and Uninstall 723 (for example, uninstalling an application from the display device), for the user to input an operation instruction for performing the functions associated with the plurality of applications.

Here, the menu items in the menu display area 72 are still represented by the menu item name and the menu item icon.

In addition, in a menu item, the icon of the menu item and the name of the menu item are arranged from left to right. As shown in FIG. 7A, the name Sort in the menu item 721 and the blue rectangle bar of the menu item icon are arranged from left to right in a horizontal direction, the name Add to home in the menu item 722 and the green rectangle bar of the menu item icon are arranged from left to right in the horizontal direction, and the menu item name Uninstall in the menu item 723 and the red rectangular bar of the menu item icon are arranged from left to right in the horizontal direction. The menu items are arranged in a direction from one edge to the other in the menu display area. For example, as shown in FIG. 7A, menu items 721~723 are arranged in a row from right to left in the menu display area 72.

In addition, in the menu display area, the menu items are displayed according to the actual menu items configured for the installed applications in the content display area and the actual locations calculated for these menu items.

For example, as shown in FIG. 7A, three menu items 721~723 are configured for the installed application to perform its related functions by default. At the same time, in order to ensure the complete display of menu item names of the menu items, the menu item names do not exceed their own menu item icon portion or overlap with each other, the three menu items are displayed according to the actual layout location arranged in a right-left direction in the menu display area 72; neither is that the menu item icon in the unconfigured menu item is displayed, but the menu item name is not displayed, and the configured menu item is still displayed in the preset fixed location and the arrangement way as shown in FIG. 3G, nor is that the unconfigured menu item is not displayed, and the configured menu item is still displayed in the preset fixed location and the arrangement way as shown in FIG. 3H.

Figure 7B:
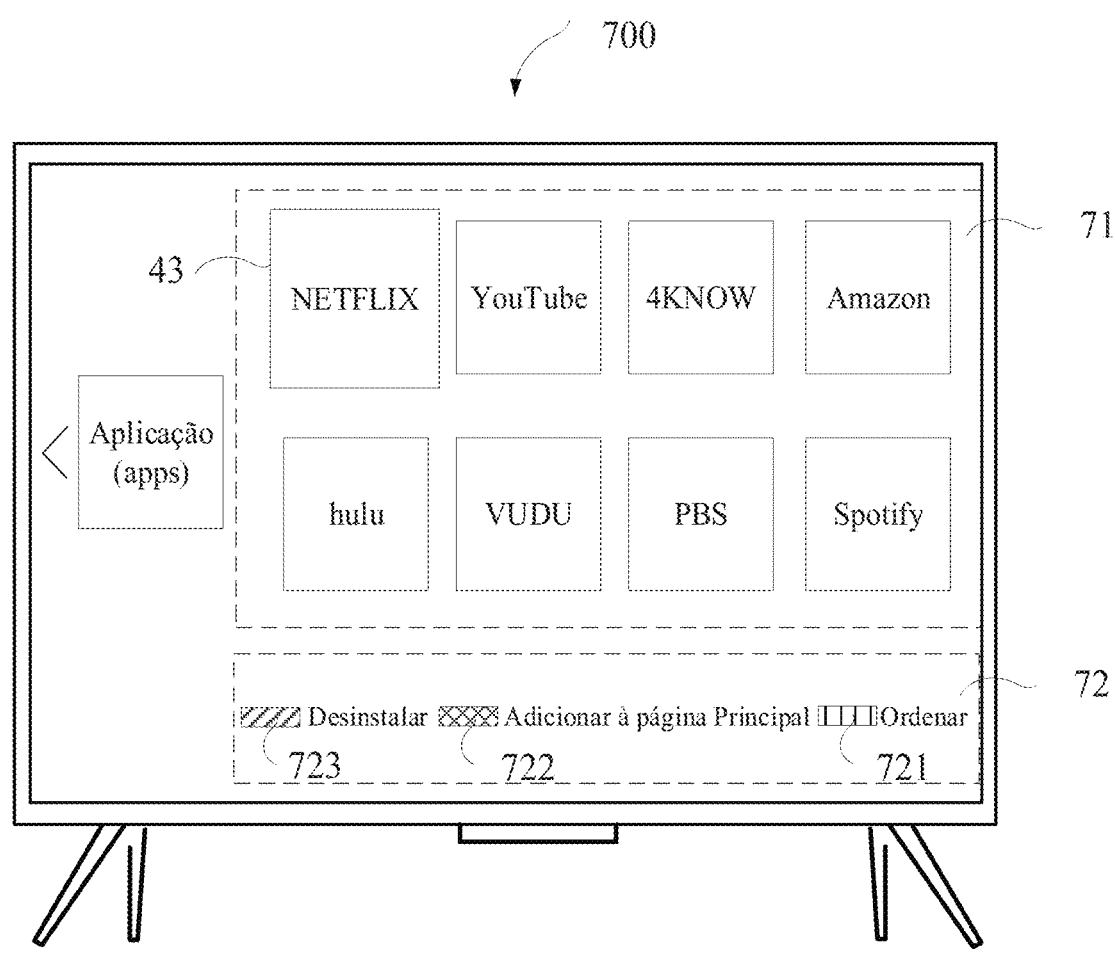
FIG. 7B illustrates a second schematic diagram of the GUI700 provided by a display device 200 according to the embodiments of the present application.

In some embodiments, when the display device performs the operation shown in FIGS. 5A~5E based on a user input and changes its own system language from English to Portuguese, the display device may once again display the GUI700 associated with Aplicação (Apps) 411 based on an instruction for activating Aplicação (Apps) 411, as shown in FIG. 7B. The language corresponding to the contents in the content display area 71 and the menu display area 72 provided by the GUI700 is switched to Portuguese. For example, in the menu display area 72, the menu item names corresponding to the right-to-left arranged menu items 721~723 are displayed as Ordenar, Adicionar à página Principal and Desinstalar respectively.

It may be seen from FIGS. 7A and 7B that because the same menu item name in English and Portuguese has different text widths, the display locations of the menu items 721~723 in the menu display area 72 are different when the system language is English and when the system language is Portuguese. For example, since the text of the menu item name of the menu item 722 in Portuguese has a larger width than that in English, the actual width of the text of the menu item 722 in Portuguese in the menu display area 72 is larger than that in English, which further leads to the difference of the display locations of the menu item 722 in the menu display area 72 in the two system languages.

Therefore, in FIG. 7B, after the display device changes its system language from English to Portuguese, the display device recalculates the actual locations of the three menu items configured for the installed applications in the menu display area, and then displays the menu items on the calculated actual locations. In this way, it may be ensured that the menu item names of the menu items are all displayed completely, and the menu item names do not exceed the menu item icon portion or overlap with each other.

Figure 7C:
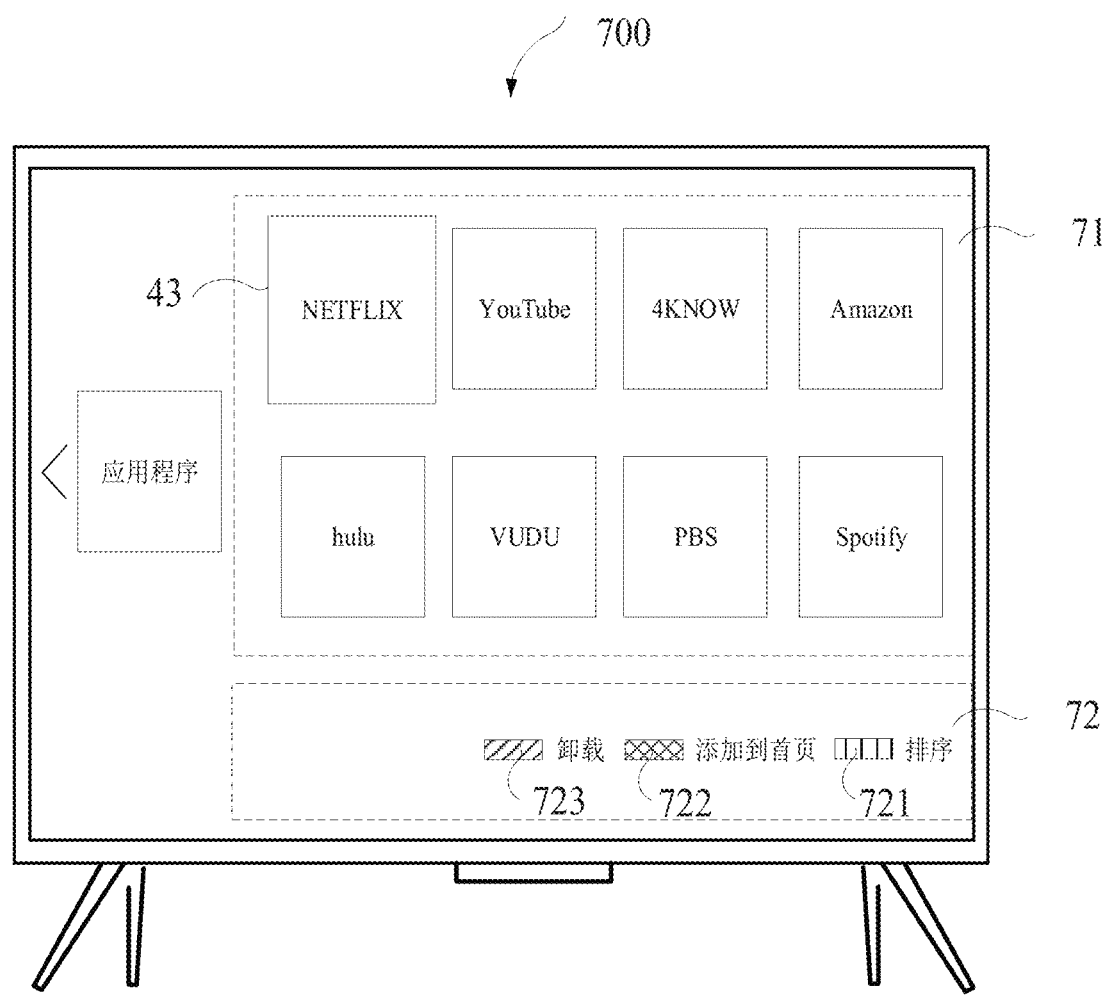
FIG. 7C illustrates a third schematic diagram of the GUI700 provided by a display device 200 according to the embodiments of the present application.

In other embodiments, when the display device performs the operation shown in FIGS. 5A~5E based on user input and changes its own system language from English to Chinese, the display device may once again display the GUI700 associated with the application (Apps) 411 based on a user input instruction for activating the application (Apps), as shown in FIG. 7C. The language corresponding to the contents in the content display area 71 and the menu display area 72 provided by the GUI700 is switched to Chinese. For example, in the menu display area 72, the menu item names corresponding to the right-to-left menu items 721~723 are displayed as "排序 (Sort)", "添加到首页 (Add to home)" and "卸载 (Uninstall)" respectively.

It may be seen from FIGS. 7A and 7C that the display locations of the menu items 721~723 in the menu display area 72 are different when the system language is English and when the system language is Chinese. For example, since the text of the menu item name of the menu item 723 in English has a larger width than that in Chinese, the actual width of the text of the menu item 723 in English in the menu display area 72 is larger than that in Chinese, which further leads to the difference of the display locations of the menu item 723 in the menu display area 72 in the two system languages.

Therefore, in FIG. 7C, after the display device changes its system language from English to Chinese, the display device recalculates the actual locations of the three menu items configured for the installed application in the menu display area, and then displays the menu items on the calculated actual locations. In this way, it may be ensured that the menu item name of the menu items are all displayed completely and the menu item names do not exceed the menu item icon parts or overlap with each other.

In the menu display area shown in FIGS. 7A~7C, the layout location of each menu item is not as shown in FIGS. 3B and 6B (that is, the menu item icon is displayed according to the fixed display location and the menu item name is arranged in the left-aligned manner with the menu item icon), but it is determined according to the width of the text corresponding to the menu item name in the current system language (such as English, Portuguese and Chinese) and the preset width of the menu item icon and is arranged from right to left. In this way, in the case that the width of the text corresponding to the menu item name is too large, the menu item name exceeding a large part of the icon area of the menu item or omitting part of the text may be avoided, so that the menu items may keep a distance, do not overlap with each other and may be displayed completely.

In addition, the above embodiments only exemplarily show information of a plurality of installed applications provided by Apps 411 on the home page of the display device and the menu items for performing the functions associated with the plurality of installed applications as shown in FIG. 3A, but this is not limited in the present embodiments.

Figure 7D:
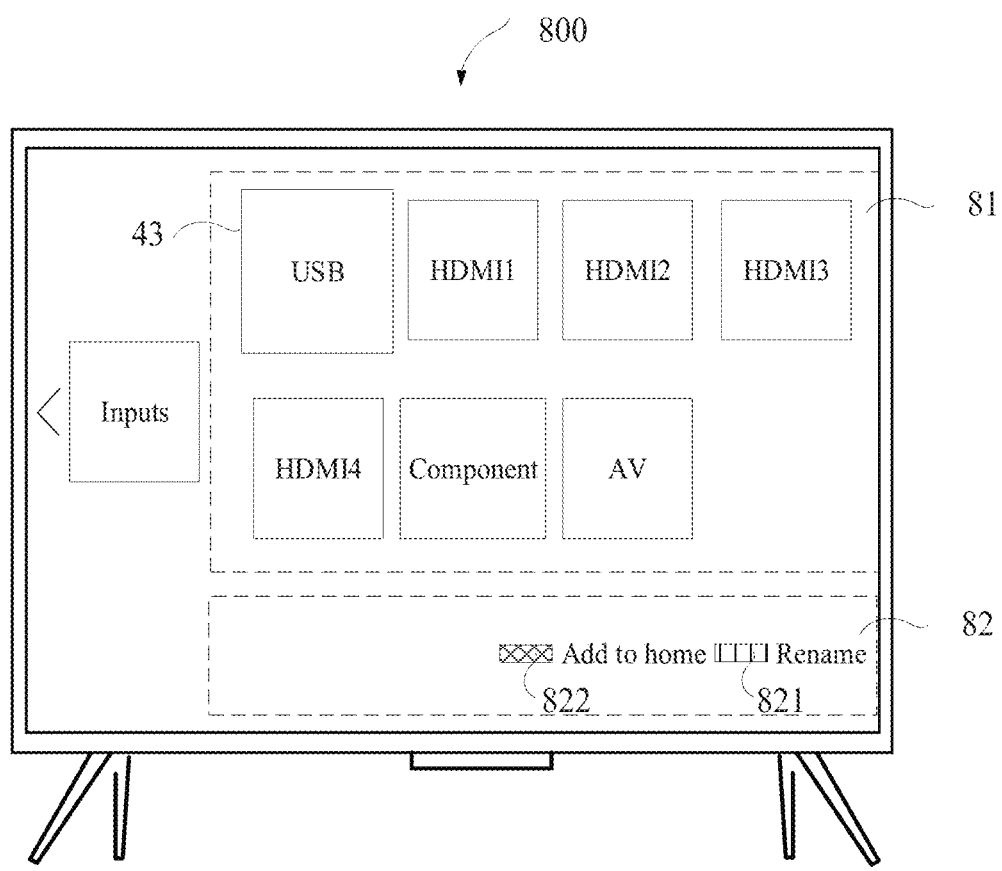
FIG. 7D illustrates a schematic diagram of a GUI800 provided by a display device 200 according to the embodiments of the present application.

For example, FIG. 7D shows the GUI800 associated with Inputs 412 as shown in FIG. 3A, wherein the GUI800 includes a content display area 81 providing a plurality of input interfaces connected to external devices and a menu display area 82 of at least one menu item for performing functions associated with the plurality of input interfaces.

Here, the content display area 81 provides the plurality of input interfaces connected with the external devices, such as HDMI, USB and AV, for users to access service contents provided by the corresponding external devices. In the menu display area 82, two menu items are provided to perform related functions on the plurality of input interfaces in the content display area 81, such as Rename821 (for example, name an input interface in a user-defined manner), Add to home822 (for example, add an input interface from GUI800 to the first display area (that is, the home page of the display device) in the GUI400), for a user to input an operation instruction to perform functions associated with the plurality of input interfaces.

At the same time, the display device calculates the layout locations of the menu items 821~822 in the menu display area 82 from right to left according to the width of the text corresponding to the menu item name in the current system language English and the preset width of the menu item icon, so that the menu items 821~822 may be displayed individually on the calculated layout locations, ensuring that the display of the menu item name in each menu item is complete, and the menu items do not overlap with each other.

Figure 8A:
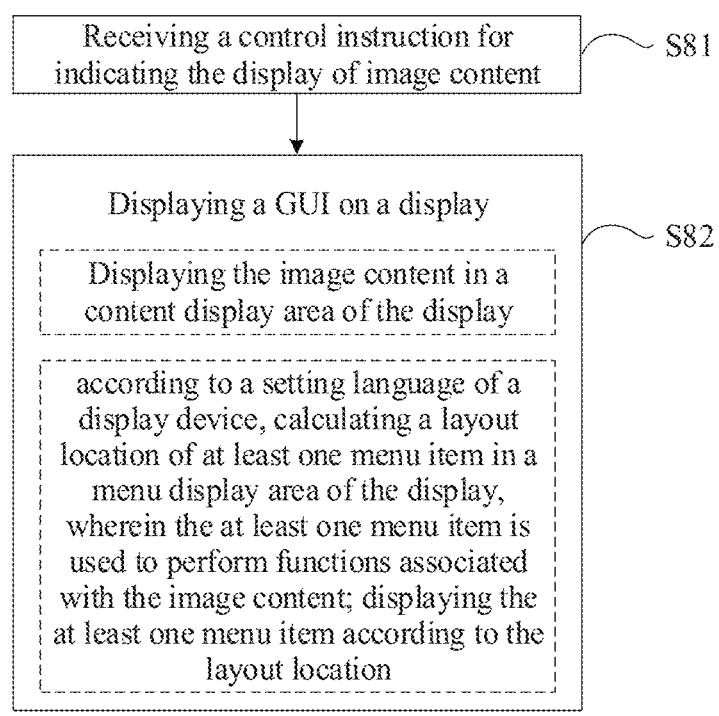
FIG. 8A illustrates a method flow chart of displaying a GUI for providing menu items for performing functions associated with an image content in a display device according to the embodiments of the present application.
Figure 8B:
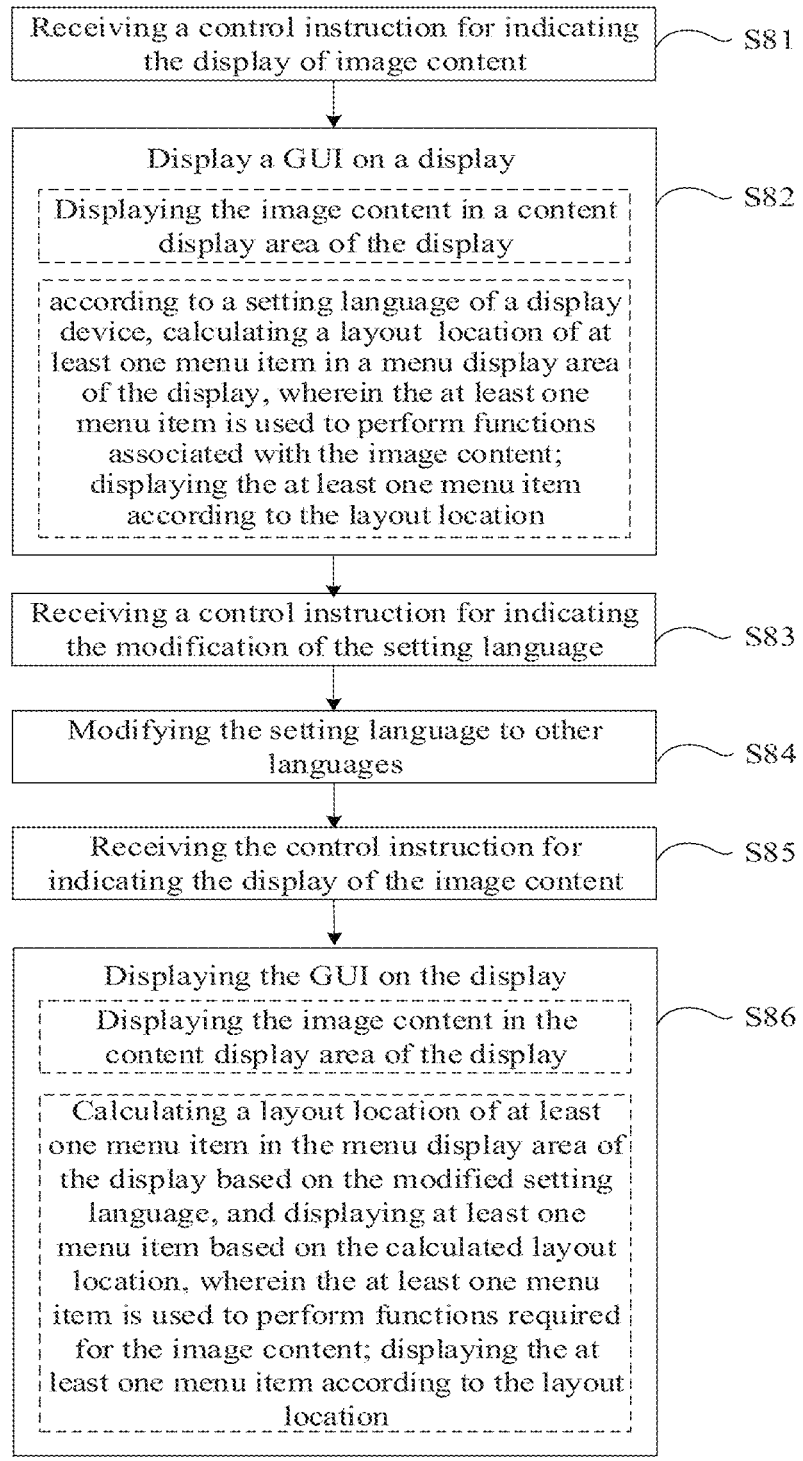
FIG. 8B illustrates a method flow chart of displaying another GUI for providing menu items for performing functions associated with an image content in a display device according to the embodiments of the present application.

FIGS. 8A to 8B exemplarily show a method flow chart of displaying GUI for providing menu items for performing functions associated with the image content in a display device according to the embodiments of the present application.

With reference to FIG. 1C and FIGS. 8A~8B, the method includes the following steps.

Step S81: receiving a control instruction for indicating display of image content which is input from a user via a user interface. For example, the user interface may receive an instruction input from the user by pressing a confirmation key on the control device and the instruction is used for activating Apps 411 in FIG. 3A corresponding to the confirmation key.

Step S82: performing displaying a GUI on a display through a controller.

The step specifically includes: displaying the image content in a content display area of the display; and calculating the actual location of at least one menu item in the menu display area of the display based on a setting language of the display device, and displaying the at least one menu item based on the calculated actual location, where the at least one menu item is configured for the image content and used to perform functions associated with the image content.

For example, in FIG. 3A, when the user presses the confirmation key on the control device, the display device may respond to the instruction for activating Apps 411 corresponding to the confirmation key. In the GUI700 as shown in FIG. 7A, information of the plurality of installed applications such as NETFLIX, YouTube and 4KNOW is displayed in the content display area 71; and in the menu display area 72, the layout locations of the menu items 721~723 for performing the functions associated with the plurality of installed applications, such as Uninstall, Add to home and Sort, may be determined according to the current system language English, and the menu items are displayed on the determined layout locations.

Step S83: receiving, via the user interface, a control instruction for indicating a modification of the setting language of the display device which is input by operating the control device from the user. For example, the user interface may receive an instruction for modifying the system language which is input by pressing a navigation button and the confirmation button on the control device from the user, as shown in FIGS. 5A-5E.

Step S84: performing, by the controller, modifying the setting language of the display device to another language. For example, after performing the operation as shown in FIGS. 5A~5E, the display device changes its system language from English to Portuguese.

Step S85: receiving, via the user interface, a control instruction for indicating display of the image content which is input by operating the control device from the user. For example, the user interface may receive an instruction for activating Apps 411 in FIG. 3A which is input by pressing the confirmation key from the user.

Step S86: performing, by the controller, displaying GUI on the display.

The step specifically includes: displaying the image content in the content display area of the display; and calculating the actual location of at least one menu item in the menu display area of the display based on the modified setting language of the display device, and displaying the at least one menu item based on the calculated actual location, wherein the at least one menu item is configured for the image content and used to perform the functions associated with the image content.

For example, the display device may perform the operation as shown in FIGS. 5A~5E based on user input to modify its system language from English to Portuguese. Then, in FIG. 6A, the display device may once again display information of the plurality of installed applications in the content display area 71 based on the instruction for activating Aplicação (Apps) 411 input from the user, as shown in FIG. 7B; and in the menu display area 72, according to the current system language Portuguese, the layout locations of the menu items 721~723 for performing the functions associated with the plurality of installed applications may be re-determined, and the menu items may be displayed at the determined layout locations, wherein the languages corresponding to the contents of the content display area 71 and the menu display area 72 are both switched to Portuguese.

Figure 9:
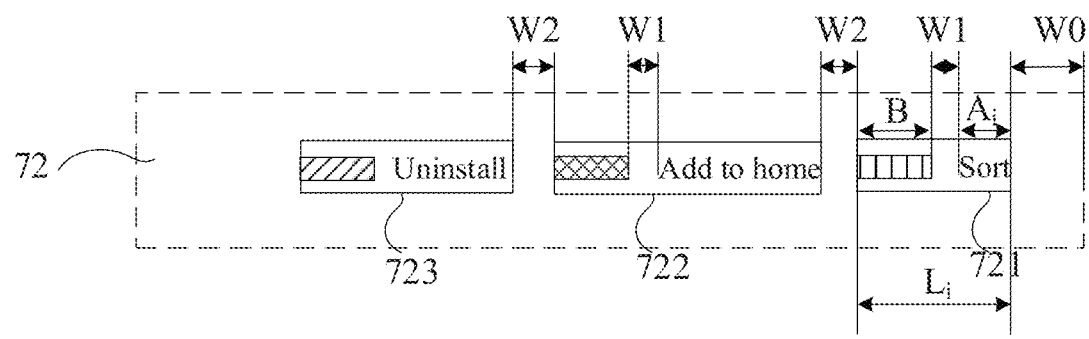
FIG. 9 illustrates a schematic diagram of a method for calculating the actual layout location of each menu item in a menu display area.

FIG. 9 illustrates a schematic diagram of a method for calculating the actual layout location of each menu item in a menu display area.

Next, meanings of relevant terms shown in FIG. 9 and below will be explained. Here, the size units of the following values are rem wherein 1 rem=30 px, where px represents a pixel unit which is with respect to the screen resolution of the display.

W0 represents a gap between the right-most menu item in the menu display area and the right-most side of the menu display area, where W0 is preset to be 1.6.

W1 represents a gap between a menu item name and a menu item icon in each menu item, where W1 is preset to be 0.4. Here, gaps between the menu item names and the menu item icons in different menu items are same.

W2 represents a gap between two adjacent menu items, where W2 is preset to be 0.8. Here, gaps between adjacent menu items are same.

$A_i$ represents the width of the text corresponding to the menu item name in each menu item, where i=1, 2, 3. Here, the display device may obtain the actual occupancy width of a string corresponding to the menu item name in the web page in the current system language by calling a client Width method in JavaScript attributes.

B represents the width of the menu item icon in each menu item, where B is preset to be 1.2. Here, widths of menu item icons in different menu items are same.

$L_i$ represents an actual occupancy width of each menu item in the menu display area, where i=1, 2, 3. Here, $L_i=A_i+B+W1$.

$S_i$ represents an actual display location of each menu item in the menu display area.

It shall be noted that the specific sizes of W0, W1, W2 and B mentioned above may be set according to actual needs. In addition, gaps between the menu item names and the menu item icons in different menu items may be different, widths of the menu item icons in different menu items may be different, and gaps between the adjacent menu items in different menu items may be different.

FIG. 9 shows the menu display area 72 in the GUI as shown in FIG. 7A. First, the menu items 721~723 for performing related functions for the plurality of installed applications in the content display area 71 are obtained; where the menu items 721~723 are represented by the menu item names and the menu item icons. Then, according to the current system language of the display device and the right-to-left arrangement direction in the menu display area 72, the actual layout locations of the corresponding menu item names and menu item icons in the menu items 721~723 are calculated in order. Finally, the menu items 721~723 are displayed on the calculated actual layout locations.

With reference to FIG. 9, the display location of the first menu item 721 at the right side of the menu display area is determined as follows.

Firstly, by calling the clientWidth method in JavaScript attributes, the actual occupancy width of the string corresponding to the menu item name Sort in the web page when the current system language is English may be obtained as $A_1=1.0$ and W0=1.6, then, the actual location $S_{1A}$ of the menu item name Sort in the menu display area is the location with a gap to the right-most side of the menu display area being 1.6 (W0)~2.6 (W0+$A_1$). Then, because W1=0.4 and B=1.2, the actual location $S_{1B}$ of the blue rectangular bar of the menu item icon in the menu display area is the location with a gap to the right-most side of the menu display area being 3.0 (2.6+W1)~4.2 (3.0+B). In other words, the actual location $S_1$ of the menu item 721 in the menu display area is the location with a gap to the right-most side of the menu display area being 1.6 (W0)~4.2 (W0+$L_1$).

With reference to FIG. 9, the display location of the second menu item 722 at the right side of the menu display area is determined as follows.

Firstly, by calling the client Width method in JavaScript attributes, the actual occupancy width of the string corresponding to the menu item name Add to home in the web page when the current system language is English may be obtained as $A_2=2.6$ and W2=0.8, then the actual location $S_{2A}$ of the menu item name Add to home in the menu display area is the location with a gap to the right-most side of the menu display area being 5.0 (4.2+W2) 7.6 (5.0+$A_2$). Then, because W1=0.4 and B=1.2, the actual location $S_{2B}$ of the green rectangular bar of the menu item icon in the menu display area is the location with a gap to the right-most side of the menu display area being 8.0 (7.6+W1)~9.2 (8.0+B). In other words, the actual location $S_2$ of the menu item 722 in the menu display area is the location with a gap to the right-most side of the menu display area being 5.0 (W0+$L_1$+W2)~9.2 (W0+$L_1$+W2+$L_2$).

With reference to FIG. 9, the display location of the third menu item 723 at the right side of the menu display area is determined as follows.

Firstly, by calling the clientWidth method in JavaScript attributes, the actual occupancy width of the string corresponding to the menu item name Uninstall in the web page when the current system language is English may be obtained as $A_3=2.1$ and W2=0.8, then, the actual location $S_{3A}$ of the menu item name Uninstall in the menu display area is the location with a gap to the right-most side of the menu display area being 10.0 (9.2+W2)~12.1 (10.0+$A_3$). Then, because W1=0.4 and B=1.2, the actual location $S_{3B}$ of the red rectangular bar of the menu item icon in the menu display area is the location with a gap to the right-most side of the menu display area being 12.5 (12.1+W1)~13.7 (12.5+B). In other words, the actual location $S_3$ of the menu item 723 in the menu display area is the location with a gap to the right-most side of the menu display area being 10.0 (W0+$L_1$+2*W2+$L_2$)~13.7 (W0+$L_1$+2*W2+$L_2$+$L_3$).

After determining the actual layout locations of the menu item name and the menu item icon corresponding to each menu item in the menu display area, the menu item name and the menu item icon of each menu item are displayed based on the determined actual layout locations.

In addition, it should be noted that in the above-mentioned embodiments, the calculation method of the layout locations of the menu items is expressed only in the case that the menu items in the menu display area are arranged horizontally. Similarly, the calculation method of the layout locations of the menu items in the present embodiments is also applicable to a scenario where the menu items in the menu display area are arranged vertically.

In some embodiments, the display location of each of the menu items 721~723 in the menu display area 72 may be determined by the following codes:

```
<hi-group
class="deadLine" :location="'absolute'" :width="39.2" :height="2.5" :left="24.8":bottom="0":st
yle="DeadLineStyle">
    <hi-group
id="ColorButton":location="'absolute'" :width="39.2" :height="2.4" :bottom="0">
        <hi-group      v-for="(item,    index)     in    rightHotKeys"
class="rightHotKeys":key="index" :location="'absolute'" :height="2.4" :width="item.icon Width
+item.nameLength+0.4" :right="item.lastLength + index*0.8 +1.6">
            <hi-text:ref="'colorText-'+index"
class="hotKeyName":textContent="$t(item.name)":textSize="0.8"
align="left" :location="'absolute'" :display="'inline-block'" :top="0.55" :height="1.2":width="it
em.nameLength+0.1":right="0">
            </hi-text>
            <hi-img           class="hotKeyImg":src="item.icon"
align="right" :width="item.iconWidth" :height="item.iconHeight" :location="'absolute'" :displa
```

```
y="'inline-block'" :top="0.55" :right="item.nameLength + 0.4">
              </hi-img>
           </hi-group>
      </hi-group>
</hi-group>.
```

In the above algorithm, "ColorButton" may represent the menu display area 72, "hotKeyImg" may represent the menu item icons of the menu items 721~723, "hotKeyName" may represent the menu item names of the menu items 721~723, "rightHotKeys" may represent the menu items at the right side of the menu item whose display location is currently determined, "nameLength" may represent the total width of the menu items above, "LastLength" may represent the total width of all the menu items before the menu items whose display locations are currently determined.

In addition, the following algorithms may be used to calculate "nameLength" and "lastLength".

First, the data content of rightHotkeys is declared in data, and the initial values of nameLength and lastLength are set to 0:

```
"data ( ) {
    return {
       rightHotKeys: [
          {
                name: 'SE2400',
                icon: 'launcher/ic_hotkey_yellow_holo.png',
                iconWidth: 1.2,
                iconHeight: 1.2,
                nameLength: 0,
                lastLength: 0,
          },
          {
                name: 'SE3146',
                icon: 'launcher/ic_hotkey_green_holo.png',
                iconWidth: 1.2,
                iconHeight: 1.2,
                nameLength: 0,
                lastLength: 0,
          },
          {
                name:'OT0133',
                icon:'launcher/ic_hotkey_red_holo.png',
                iconWidth: 1.2,
                iconHeight: 1.2,
                nameLength: 0,
                lastLength: 0,
          },
       ],
    }
},".
```

Then, when mounted, each item in rightHotKeys is traversed, and nameLength and lastLength serving as two variables are calculated:

```
"mounted : function( ){
    for(let i = 0;i<this.rightHotKeys.length;i++){
       this.rightHotKeys[i].nameLength                              =
this.$refs['colorText-'+i][0].$el.lastElementChild.clientWidth/30;
       if(i>0){
          let     lastBlockWidth     =     this.rightHotKeys[i-1].nameLength    +
this.rightHotKeys[i-1].iconWidth + 0.4; // width of the previous block
          this.rightHotKeys[i].lastLength  =  this.rightHotKeys[i-1].lastLength  +
lastBlockWidth;      // total width of the previous n blocks
       }
    }
},".
```

As described in the above embodiments, the actual layout locations of the menu item name and the menu item icon in each menu item may be sequentially determined by the display device according to the width of the text corresponding to the menu item name in the current system language (such as English, Portuguese and Chinese), the preset width of the menu item icon and the arrangement direction from one edge to the other edge in the menu display area. In this way, the layout locations of the menu items in different system languages may be self-adapted, so that the menu items may keep a distance, do not overlap with each other and may be displayed completely.

Although preferred embodiments of the present application have been described, once learned the basic creative concepts, those skilled in the art may make additional changes and modifications on these embodiments. Therefore, the appended claims are intended to be interpreted as including the preferred embodiments and all the changes and modifications falling within the scope of the present application.

Obviously, those skilled in the art may make various changes and variations on the present application without departing from the spirit and scope of the present application. In this way, if these modifications and variations of the present application fall within the scope of the claims of the present application and its equivalents, the present application is also intended to include these modifications and variations.

The invention claimed is:

1. A method for presenting a Graphical User Interface (GUI) in a display device, comprising:
   in response to a first control instruction for displaying first image content input from a user, displaying the first image content in a content display area of a display;
   according to a setting language of the display device, calculating a first layout location of at least one menu item in a menu display area of the display, wherein the at least one menu item is configured for the first image content and used to perform functions associated with the first image content; and
   displaying the at least one menu item according to the first layout location;
   wherein the calculating the first layout location of the at least one menu item in the menu display area comprises:

calculating a width occupied by the at least one menu item in the menu display area according to the setting language of the display device; and determining the first layout location of the at least one menu item in the menu display area according to the calculated width and an arrangement direction from one edge to an other edge of the menu display area.

2. The method according to claim 1, wherein the at least one menu item is configured by default or by settings of the user.

3. The method according to claim 1, wherein the at least one menu item is arranged from one edge to an other edge of the menu display area, so as to keep any two menu items spaced without overlapping with each other.

4. The method according to claim 1, wherein a menu item of the at least one menu item comprises a name of the menu item and an icon of the menu item.

5. The method according to claim 4, wherein the calculating the width occupied by the at least one menu item in the menu display area comprises:

calculating a text width corresponding to the name of the menu item in the setting language of the display device;

obtaining a width corresponding to the icon of the menu item; and determining a sum of the text width corresponding to the name and the width corresponding to the icon as the width occupied by the menu item.

6. The method according to claim 1, wherein the method further comprises:

in response to a second control instruction for modifying the setting language of the display device input from the user, updating the setting language of the display device;

in response to a third control instruction for displaying second image content input from the user, displaying the second image content in the content display area of the display, wherein the second image content corresponds to the first image content in updated setting language of the display device;

calculating a second layout location of the at least one menu item in the menu display area of the display according to the updated setting language of the display device, wherein the at least one menu item is configured for the second image content and used to perform functions associated with the second image content; and updating display of the at least one menu item in the content display area according to the second layout location.

7. The method according to claim 1, wherein function information of a menu item of the at least one menu item corresponds to a color key on a control device for providing user input to the display device.

8. A display device, comprising:

a display configured to display images; and a controller configured to:

in response to a first control instruction for display of first image content input from a user, display the first image content in a content display area of the display;

according to a setting language of the display device, calculate a first layout location of at least one menu item in a menu display area of the display, wherein the at least one menu item is configured for the first image content and used to perform functions associated with the first image content; and display the at least one menu item according to the first layout location;

wherein the controller is configured to calculate the first layout location of the at least one menu item in the menu display area by:

calculating a width occupied by the at least one menu item in the menu display area according to the setting language of the display device; and determining the first layout location of the at least one menu item in the menu display area according to the calculated width and an arrangement direction from one edge to an other edge of the menu display area.

9. The display device according to claim 8, wherein the at least one menu item is configured by default or by settings of the user.

10. The display device according to claim 8, wherein the at least one menu item is arranged from one edge to an other edge of the menu display area, so as to keep any two menu items spaced without overlapping with each other.

11. The display device according to claim 8, wherein a menu item of the at least one menu item comprises a name of the menu item and an icon of the menu item.

12. The display device according to claim 11, wherein the controller is configured to calculate the width occupied by the at least one menu item in the menu display area by:

calculating a text width corresponding to the name of the menu item in the setting language of the display device;

obtaining a width corresponding to the icon of the menu item; and determining a sum of the text width corresponding to the name and the width corresponding to the icon as the width occupied by the menu item.

13. The display device according to claim 8, wherein the controller is further configured to:

in response to a second control instruction for modification of the setting language of the display device input from the user, update the setting language of the display device;

in response to a third control instruction for display of second image content input from the user, display the second image content in the content display area of the display, wherein the second image content corresponds to the first image content in updated setting language of the display device;

calculate a second layout location of the at least one menu item in the menu display area of the display according to the updated setting language of the display device, wherein the at least one menu item is configured for the second image content and used to perform functions associated with the second image content; and update display of the at least one menu item in the content display area according to the second layout location.

14. The display device according to claim 8, wherein function information of a menu item of the at least one menu item corresponds to a color key on a control device for providing user input to the display device.

* * * * *